US012703514B2

(12) United States Patent
Vedant et al.

(10) Patent No.: US 12,703,514 B2
(45) Date of Patent: Aug. 11, 2026

(54) MULTIFUNCTIONAL STRUCTURES FOR ATTITUDE CONTROL

(71) Applicant: The Board of Trustees of the University of Illinois, Urbana, IL (US)

(72) Inventors: Vedant, Urbana, IL (US); James T. Allison, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 18/989,672

(22) Filed: Dec. 20, 2024

(65) Prior Publication Data

US 2025/0145311 A1 May 8, 2025

Related U.S. Application Data

(62) Division of application No. 17/596,797, filed as application No. PCT/US2020/016108 on Jan. 31, 2020, now Pat. No. 12,214,910.

(60) Provisional application No. 62/862,412, filed on Jun. 17, 2019.

(51) Int. Cl.
*B64G 1/24* (2006.01)
*B64G 1/28* (2006.01)
*B64G 1/44* (2006.01)

(52) U.S. Cl.
CPC ............... *B64G 1/244* (2019.05); *B64G 1/28* (2013.01); *B64G 1/443* (2013.01)

(58) Field of Classification Search
CPC .......... B64G 1/244; B64G 1/28; B64G 1/443; B64G 1/44
See application file for complete search history.

(56) References Cited

U.S. PATENT DOCUMENTS 3,601,338 A * 8/1971 Shigehara .............. B64G 1/244 244/167
5,669,586 A 9/1997 Tadros
5,850,992 A 12/1998 Flament et al.
6,135,392 A 10/2000 Wakugawa
6,450,453 B1 * 9/2002 Roulo ...................... B64G 1/66 244/172.6
9,387,942 B2 * 7/2016 Celerier ............... B64G 1/2427
9,527,607 B2 * 12/2016 Celerier ................. B64G 1/264
10,464,694 B1 * 11/2019 Schwarz ................ B64G 1/242
(Continued)

FOREIGN PATENT DOCUMENTS

CA 2281572 A1 * 10/1998 ............. H02N 2/043

OTHER PUBLICATIONS

Chilan et al., ("Co-Design of Strain-Actuated Solar Arrays for Spacecraft PrecisionPointing and Jitter Reduction") (Year: 2017).*
(Continued)

*Primary Examiner* — Assres H Woldemaryam
(74) *Attorney, Agent, or Firm* — McDonnell Boehnen Hulbert & Berghoff LLP

(57) ABSTRACT

A structure for changing the attitude of a spacecraft is provided including an elongated member and a plurality of actuators coupled to the elongated member. The elongated member is coupled to the spacecraft. The elongated member has a length and an angular position relative to an axis. The plurality of actuators are configured to deflect the angular position of the elongated member relative to the axis and to alter the length of the elongated member.

20 Claims, 23 Drawing Sheets

Phase A

Phase B

(56) References Cited

U.S. PATENT DOCUMENTS

| | | | | |
|---|---|---|---|---|
| 11,459,129 | B2 * | 10/2022 | Kawamura | B64G 1/264 |
| 11,685,554 | B2 * | 6/2023 | Nicholson | B64G 1/402 244/172.5 |
| 2016/0155073 | A1 * | 6/2016 | Augenstein | G06Q 10/06314 705/7.24 |
| 2016/0176545 | A1 * | 6/2016 | Munir | B64G 1/262 244/158.6 |
| 2017/0283094 | A1 * | 10/2017 | Ho | B64G 1/2429 |
| 2018/0148197 | A1 * | 5/2018 | Halsband | B64G 1/26 |

OTHER PUBLICATIONS

Makhtoumi, ("Active Vibration Control of Launch Vehicle on Satellite Using Piezoelectric Stack Actuator") (Year: 2018).*

Vedant et al. "Multifunctional Structures for Attitude Control" (Year: 2019).*

Chilan et al., "Design of Strain-Actuated Solar Arrays for Spacecraft Precision Pointing and Jitter Reduction," AIAA Journal, Sep. 2017, pp. 3180-3195, vol. 55, No. 9.

European Patent Office, Extended European Search Report mailed on May 23, 2023, issued in connection with European Patent Application No. 20827109.8, 9 pages.

International Searching Authority, International Search Report and Written Opinion mailed on Apr. 14, 2020, issued in connection with International Patent Application No. PCT/US2020/016108, filed on Jan. 31, 2020, 9 pages.

Nakka et al., "Nonlinear Attitude Control of a Spacecraft with Distributed Actuation of Solar Arrays," American institute of Aeronautics and Astronautics, https://doi.org/10.2614/1.G003478, 2019, 39 pages.

Yang et al. ("Kinematic Design of a Six-DOF Parallel-Kinematics Machine With Decoupled-Motion Architecture", Nov. 2004.

* cited by examiner

Figure 4
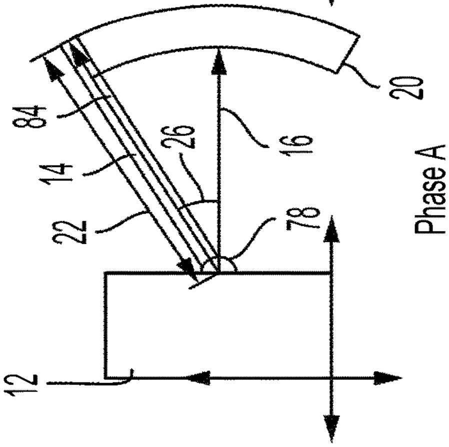
Figure 5
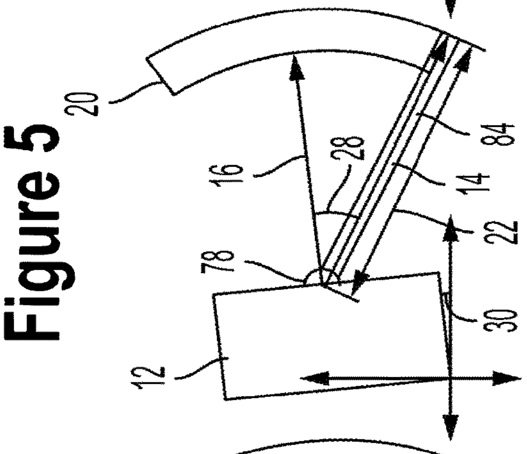
Figure 6
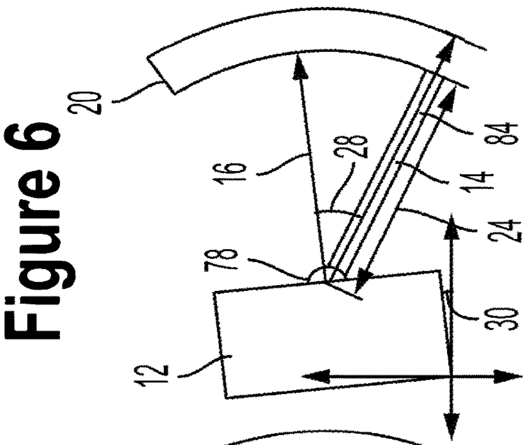
Figure 7
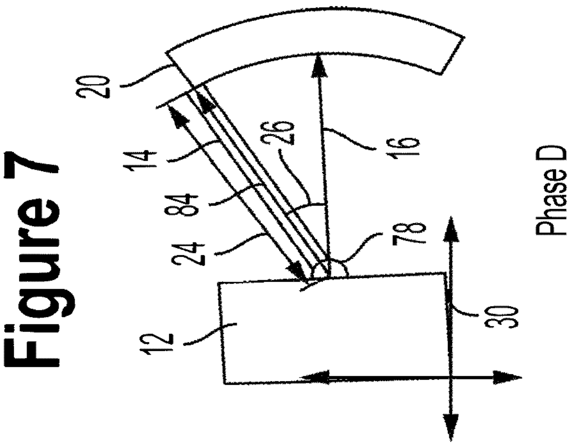
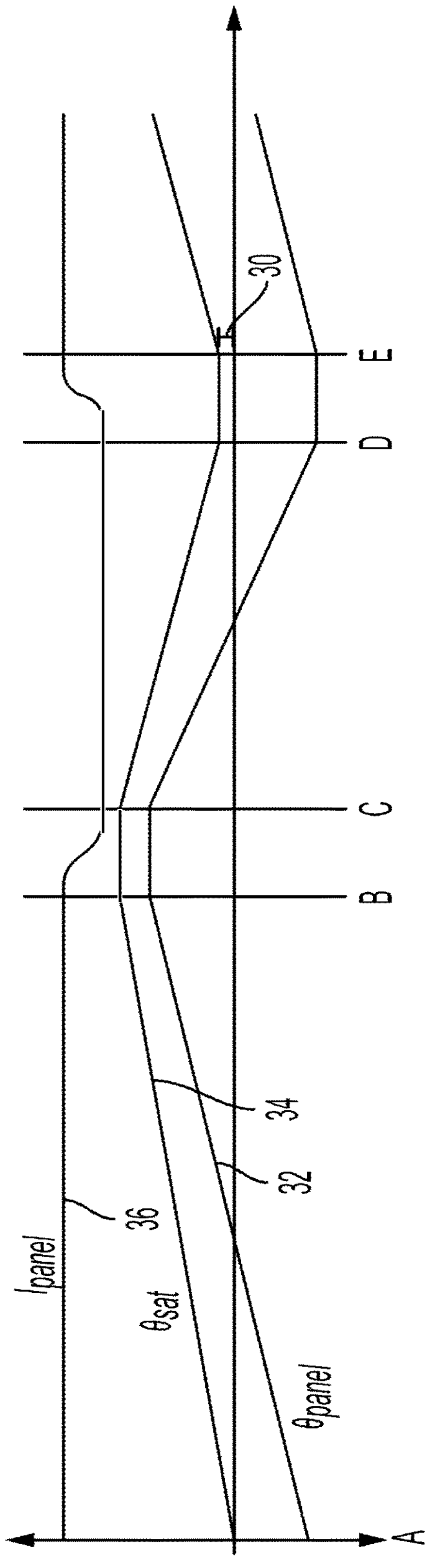
Figure 8
Phase A
Phase B
Phase C
Phase D
12
14
16
20
22
24
26
28
30
78
84
$I_{panel}$
$\theta_{sat}$
$\theta_{panel}$
36
34
32
A
B
C
D
E 14
14
14
18
16
44
22
44
16
24
44
20
16
46
50
50
48
48
50
48
46
46
38
40
38
40
38
40
52
52
52
42
42
42

Top View

MULTIFUNCTIONAL STRUCTURES FOR ATTITUDE CONTROL

CROSS-REFERENCE TO RELATED APPLICATIONS

The present application is a divisional of U.S. patent application Ser. No. 17/596,797, filed Dec. 17, 2021; which is a national stage entry of PCT/US2020/016108, filed Jan. 31, 2020; which claims the benefit of U.S. Provisional Pat. App. No. 62/862,412, filed Jun. 17, 2019. The contents of each of which are hereby incorporated by reference.

BACKGROUND

Attitude control systems are used to orient a spacecraft to a particular point in the sky, or to maintain a specific orientation over time. Accuracy of attitude control may be critical, especially for optics-based payloads. Existing control systems, such as reaction wheel assemblies (RWA), control moment gyroscopes (CMG), reaction thrusters, magnetic torque coils all have disadvantages. RWAs and CMGs require constant rotation, which can decrease reliability and cause jitters and vibrations transmitted to the rest of the spacecraft. Furthermore, RWAs and CMGs can become saturated, causing a lack of attitude control about one or more axes. Reaction Thrusters require fuel to operate, increasing the weight of the spacecraft. Magnetic torque coils can cause electromagnetic interference to many different sensitive payloads. Therefore, an attitude control system that can reduce excess vibrations, increase reliability, avoid electromagnetic interference, and operate without fuel is desirable.

SUMMARY

The present disclosure relates to systems, devices, and methods relating to control systems for spacecraft and more specifically to attitude control mechanisms for spacecraft.

In a first aspect, a structure for changing an attitude of a spacecraft is provided. The structure includes an elongated member coupled to the spacecraft. The elongated member has a length and an angular position relative to an axis passing through the spacecraft. The structure also includes a plurality of actuators coupled to the elongated member. The plurality of actuators are configured to deflect the angular position of the elongated member relative to the axis, and to alter the length of the elongated member.

In a second aspect, an attitude control system for a spacecraft is provided. The attitude control system includes a body and an elongated member coupled to the body. The elongated member extends outwardly from the body. The elongated member includes a plurality of actuators embedded within the elongated member. The plurality of actuators are configured to deflect a position of the elongated member, and to alter a mass moment of inertia of the elongated member.

In a third aspect, a method of changing an attitude of a spacecraft is provided. The spacecraft includes a body, an elongated member coupled to the body and extending outwardly from the body at an initial length and an initial position relative to an axis, and a plurality of actuators embedded within the elongated member. The method includes deflecting the elongated member relative to the axis. The method also includes altering the initial length of the elongated member. The method yet further includes deflecting the elongated member to restore the elongated member to the initial position relative to the axis.

Other aspects, embodiments, and implementations will become apparent to those of ordinary skill in the art by reading the following detailed description, with reference where appropriate to the accompanying drawings.

BRIEF DESCRIPTION OF THE FIGURES

The embodiments may be better understood with reference to the following drawings and description. The components in the figures are not necessarily to scale. Moreover, in the figures, like-referenced numerals designate corresponding parts throughout the different views.

FIGS. 4-7 illustrate side plan views of a second example of a body and an elongated member in different positions while moving through a rotation cycle.

FIG. 8 illustrates a chart indicating changes in length of the elongated member, angle of the body, and angle of the elongated member corresponding to the different positions of the body and elongated member shown in FIGS. 4-7.

DETAILED DESCRIPTION

Figures 1, 2, 3:
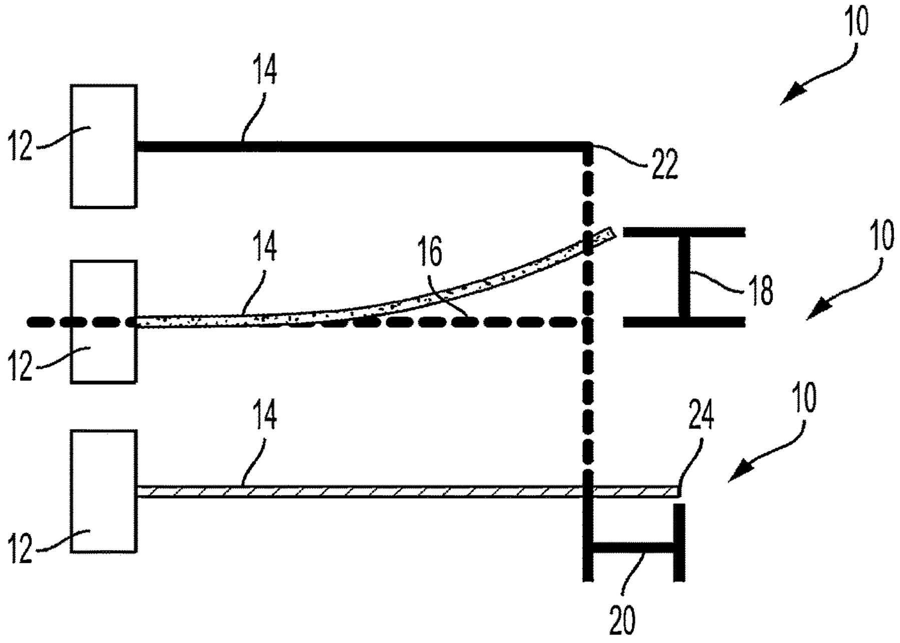
FIGS. 1-3 illustrate side plan views of a first example of a body and an elongated member in different positions.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure relates to an attitude control system described herein as Multifunctional Structures for Attitude Control (MSAC). The MSAC system utilizes deployable structures to provide fine pointing and large slewing capabilities for spacecraft. These deployable structures utilize distributed actuation, such as piezoelectric strain actuators, to control flexible structure vibration and motion.

A related type of intelligent structure has been introduced recently for precision spacecraft attitude control, called Strain Actuated Solar Arrays (SASA). MSAC extends the capabilities of the SASA concept such that arbitrarily large angle slewing can be achieved at relatively fast rates, thereby providing a means to replace Reaction Wheel Assemblies (RWA) and Control Moment Gyroscopes (CMG). MSAC utilizes actuators bonded to deployable panels, such as solar arrays or other structural appendages, and bends the panels to use inertial coupling for small-amplitude, high-precision attitude control and active damping.

This disclosure describes the MSAC concept, operational principles for MSAC, and describes a lumped low-fidelity Hardware-in-the-Loop (HIL) prototype and testbed. Some preliminary experimental results obtained using this prototype provided valuable insight into the design and performance of this new class of attitude control systems. Based on these results and developed principles, a useful lumped-parameter model has been developed to use in further system refinement.

In one example, a structure for changing the attitude of a spacecraft is provided including an elongated member and a plurality of actuators coupled to the elongated member. The elongated member is coupled to the spacecraft. The elongated member has a length and an angular position relative to an axis. The plurality of actuators are configured to deflect the angular position of the elongated member relative to the axis and to alter the length of the elongated member.

One technical advantage of the systems and methods described below may be that the attitude control system described may have no continuously spinning or sliding parts, increasing the reliability of the system by reducing the number of modes of failures, and reducing vibration or jitters. Another technical advantage of the systems and methods described below may be that the attitude control system may require no fuel, increase the length of time over which the attitude control system may be used, and decrease the weight of the spacecraft. Yet another advantage of the systems and methods described below may be that the system may produce only a negligible electromagnetic field, avoiding potential electromagnetic interference with sensitive payloads.

II. Example Systems

An Attitude Control System (ACS) is a critical spacecraft sub-system, often important for proper functioning and positioning of the spacecraft. Several mission classes, such space observatories, synthetic-aperture, radar (SAR), and deep space missions require a precise, accurate, and reliable ACS as an essential technology. However, one of the problems with existing ACS systems is that they can produce a significant amount of vibration in the system which will need to be damped or dissipated or accounted for within the control system; this has been the topic of several studies. Missions that require a more stable spacecraft platform (e.g., Hubble or other imaging systems) also utilize passive vibration isolation systems to have improved pointing accuracy. The collection of high-quality scientific data depends on fast and accurate reorientation and jitter reduction. Therefore, high-precision attitude control is crucial for useful space-based data gathering.

Strain-actuated solar arrays (SASA) have the potential to achieve the positioning goals effectively by using distributed internal actuation across SAs (or other structural appendages). One practical method for accomplishing this internal actuation is with piezoelectric actuators bonded to SAs. While this control architecture performs well, a key drawback of the SASA technology is the reliance on other ACS to produce coarse, large-angle slewing.

The most commonly used ACS for large-angle slewing are Reaction Wheel Assemblies (RWAs) and Control Moment Gyroscopes (CMGs). In some embodiments of the SASA concept, deployable structures can be utilized to provide large-angle slewing in addition to jitter reduction. This extension of SASA principles is termed Multifunctional Structures for Attitude Control (MSAC). These additional capabilities allow MSAC to replace conventional ACS technologies, thereby eliminating a key source of vibrational noise onboard spacecraft, while reducing the mass, volume, and power budget of the ACS simultaneously. The compliant and distributed actuator based MSAC system will also have no sliding failure modes, and will be robust to individual actuator failure.

The MSAC system utilizes existing deployable structures/appendages (such as solar arrays or radiators) as multifunctional devices, as demonstrated in FIGS. 1-3. This multi-role use of the solar panels extends their utility with a low mass penalty while increasing spacecraft ACS reliability. MSAC adds completely new functionality to SASA systems: Execution of arbitrarily-large spacecraft rotations (secular motion) with no sliding contacts in the ACS.

a. Operating Principles

To produce secular motion, transverse oscillations of the deployable panels are utilized in combination with moment of inertia (MOI) reconfigurations. Both oscillations and reconfigurations are achieved by exercising the same set of distributed actuators. Strategic adjustments to MOI between transverse oscillations produce a secular change in attitude. One mechanism for changing MOI is to induce longitudinal strains, increasing or decreasing the MOI about the vehicle axis of rotation. To illustrate one possible instantiation of the MSAC concept, the two constituent phases are illustrated using a single axis of rotation MSAC system as follows:

1. Strain deployable structures for jitter control or for producing small slew maneuvers in the transverse panel direction. In some embodiments, this could include straining from the elastic equilibrium position (FIG. 1) to a displaced position (FIG. 2).
2. Strain deployable structures to alter inertial properties (e.g., straining from an initial configuration (FIG. 1) to a final configuration (FIG. 3)).

The latter element is a nonlinear behavior that allows the ACS to "reset" between movements, producing a secular variation in attitude.

b. Example Embodiments of MSAC System

FIGS. 1-3 illustrate side plan views of a first example of a spacecraft 10 having a body 12 and an elongated member 14 in different positions. The spacecraft 10 may be any vehicle adapted to travel through space, such as a satellite. The body 12 may be any portion of the spacecraft 10 which carries a payload or about which the spacecraft 10 may be rotated. Examples of the body 12 may include a housing, a fuselage, a sensor, and a telescope. The elongated member 14 may be portion of the spacecraft 10 which is coupled to and extends away from the body 12 to allow attitude adjustment of the spacecraft 10. Examples of the elongated member 14 may include a pylon, a solar panel, or a truss.

The elongated member 14 may extend away from the body 12 along an axis (16 in FIG. 2). The axis 16 may be any line which passes through the body 12 and along which the elongated member 14 may be aligned. In some embodiments the axis 16 may be defined as the midpoint between the full range of deflection or motion of the elongated member 14. In some embodiments the axis 16 may pass through the center of mass of the spacecraft 10.

As illustrated in FIGS. 1-3, a position of the elongated member 14 may be deflected or rotated to produce a corresponding rotation on the spacecraft 10 as a whole. Similarly, a length of the elongated member 14 may be compressed or extended to change the mass moment of inertia of the elongated member 14. As shown in FIG. 1, before movement of the elongated member 14, the elongated member 14 may have an initial angular position 26 with respect to the axis 16 and an initial length 22.

The mass moment of inertia of the elongated member 14 may be the nine-element mass moment of inertia tensor that quantifies rotational inertial dynamics for a given body. The inertia tensor may be defined with respect to a coordinate system. In many embodiments, the inertia tensor may be defined with respect to a body-fixed coordinate system at the center of mass of the spacecraft. In the single axis rotational motions described in most examples here, a change to the moment of inertia corresponds to changing a single element of the inertia tensor. In the most general case, any of the inertia tensor elements may be changed by an actuators (46, 48 in FIG. 11) associated with the elongated member 14. More general moment of inertia changes such as these enable more complex behavior that may be tailored for particular systems and maneuvers. For example, a cross-term of the inertia tensor may be adjusted such that the actuator 46, 48 producing deflection about one axis of motion can produce overall spacecraft rotation about other axes in desired ways. As shown in FIG. 2, the angular position 26 of the elongated member 14 may be deflected relative to the axis 16 to produce a corresponding angular change (30 in FIG. 5) in the attitude of the spacecraft 10. In some systems, this deflection 18 may be used for producing small slew maneuvers that hold a position for short periods of time. Similarly, the deflection 18 may be used to cancel mechanical vibrations of the spacecraft.

Additionally, as shown in FIG. 3, the initial length 22 of the elongated member 14 may be compressed or extended to change the mass moment of inertia of the elongated member 14. Extending the elongated member 14 may increase the mass moment of inertia, while compressing the elongated member 14 may decrease the mass moment of inertia. The initial length 22 of the elongated member 14 may be the rest length.

The angular deflections, extensions, and compressions of the elongated member may be accomplished by multiple actuators 46, 48 coupled to the elongated member 14. The actuators 46, 48 may be any combination of devices which are capable of deflecting the angular position of the elongated member 14 and altering the mass moment of inertia of the elongated member 14. Examples of the actuators 46, 48 may include a rotational joint (78 in FIG. 4), an array of piezoelectric actuation elements (50 in FIG. 14), or a lever mechanism (82 in FIG. 18), or a linear prismatic joint (84 in FIG. 4).

c. Example Embodiments of MSAC System with Non-Holonomic Trajectories

From a dynamical system perceptive, MSAC utilizes trajectories that are non-holonomic. Peak slew rates for a lumped MSAC prototype are presented with non-holonomic trajectories as follows.

$$I_{sat}(\theta_\gamma) = (I_e - I_c)(\theta_a - \theta_b), \tag{1}$$

$$\theta_\gamma = \frac{(I_e - I_c)}{I_{sat}}(\theta_a - \theta_b), \tag{2}$$

A simplified illustration of the MSAC cycle is shown in FIGS. 4-7. It can be seen that at the end of this cycle (Phase IV, FIG. 7), the satellite body has rotated by a small angle $\theta_\gamma$, while the panels have been reset back to the same relative orientation with respect to the spacecraft as in Phase I, FIG. 4 ($\theta_a$). The average angular velocity of the attitude maneuver can be quantified using the following linear approximation:

$$\omega_\gamma \approx \frac{\theta_\gamma}{\Delta t} = \frac{(I_e - I_c)(\theta_a - \theta_b)}{I_{sat}\Delta t}, \tag{3}$$

where $\Delta t = t_{bc} + t_{be} + t_e + t_c$ is the time required to perform one complete cycle (Phase I through Phase IV), as illustrated in FIGS. 4-7.

FIGS. 4-7 illustrate side plan views of another example of the body 12 and the elongated member 14 in different positions while moving through a rotation cycle. The rotation cycle may be any combinations of deflections of the angular position and alterations of the length of the elongated member 14 which result in a secular angular change 30 of the spacecraft 10. The reachable space for the elongated member 14 (e.g., appendage/deployable panel) can be seen as the dashed yellow annulus ring sector (e.g., deflection 20).

As shown in FIG. 4, the elongated member 14 includes the rotational joint 78 which is coupled to the body 12 of the spacecraft 10. The rotational joint 78 may be able to deflect or rotate the elongated member 14 from its initial angular position 26 through a rotational single degree of freedom relative to the axis 16. The linear prismatic joint 84 may be able to compress the elongated member 14 from its initial length 22 to change the mass moment of inertia of the elongated member 14.

FIG. 5 illustrates the initial deflection of the elongated member 14 from the initial angular position 26 to the altered angular position 28 relative to the axis 16. In response to deflection of the elongated member 14, the spacecraft 10 may also undergo an angular change 30. The angular change 30 of the spacecraft 10 may be directly proportional to a function of the deflection 18 of the elongated member 14 and the initial length 22 of the elongated member 14.

FIG. 6 illustrated the compression of the elongated member 14 from the initial length 22 to the altered length 24. As illustrated in FIG. 6, compression of the elongated member 14 may decrease the mass moment of inertia of the elongated member 14. Additionally, compression of the elongated member 14 may cause a small corresponding translation to the spacecraft 10, however, this translation may be offset by balancing the motion on an opposing side of the body 12 from the elongated member 14.

FIG. 7 illustrates the deflection of the elongated member 14 from the altered angular position 28 to the initial angular position 26. In response to the deflection of the elongated member 14 back to the initial angular position 26, the spacecraft 10 may also undergo an angular change toward the initial position of the spacecraft 10. However, the elongated member 14 may have a diminished mass moment of inertia from compression of the elongated member 14 during deflection of the elongated member 14 back to the initial angular position 26. Therefore, the angular change of the spacecraft 10 back toward the initial position may be less than the angular change of the spacecraft during the initial deflection of the elongated member 14. Therefore, as a result of these manipulations of the elongated member 14 within the rotation cycle, the spacecraft 10 may undergo a net positive angular change 30.

Figure 10:
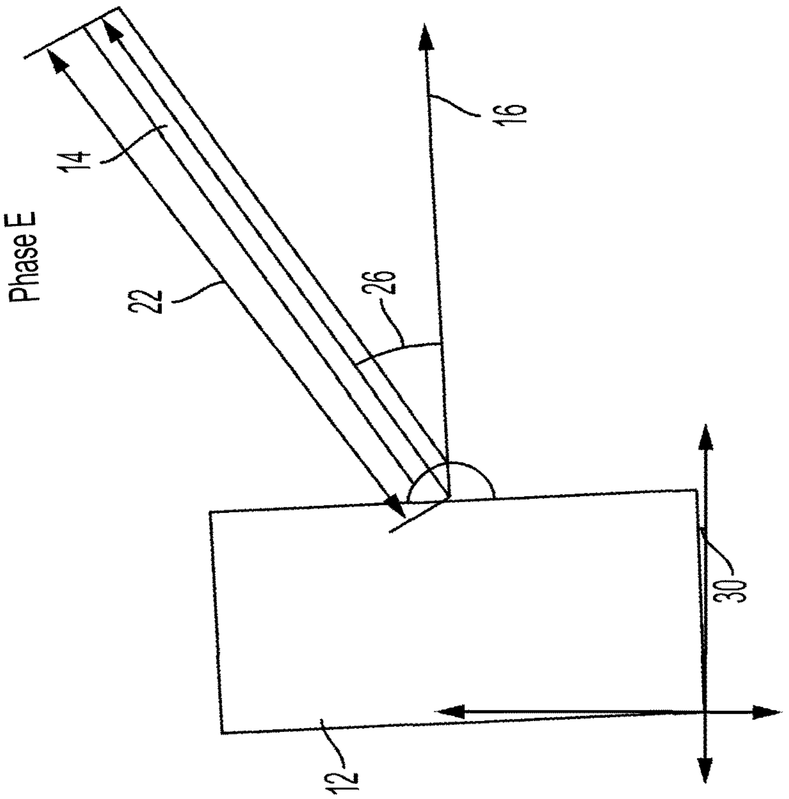
FIGS. 9 and 10 illustrate the starting position and ending position of the body and elongated member of FIGS. 4-7.
Figure 9:
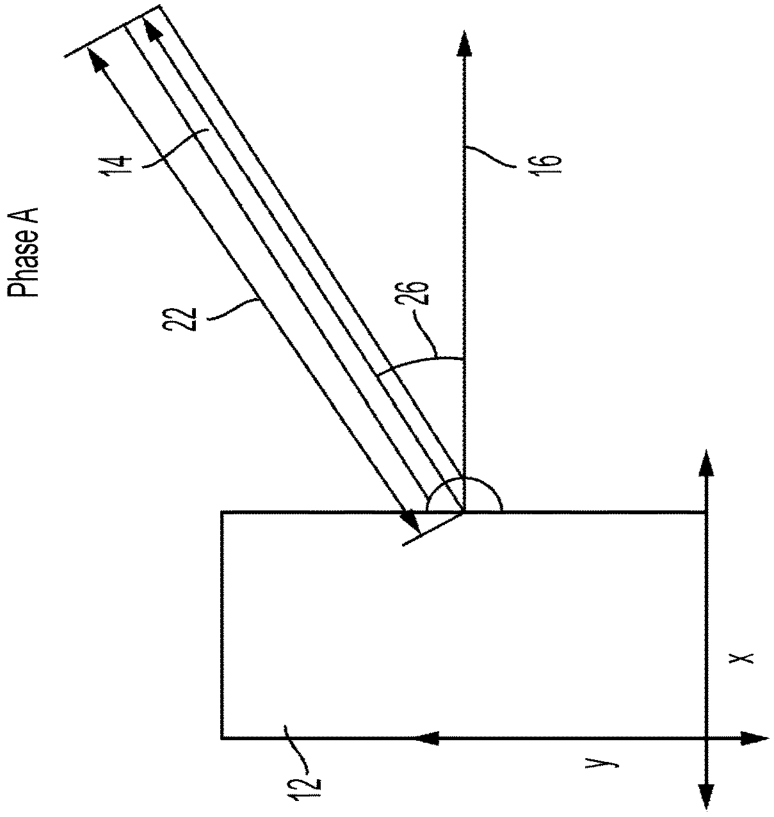

As shown in FIGS. 9 and 10, after completing the deflection back to the initial angular position 26, the length of the elongated member 14 may be altered to restore the initial length 22 of the elongated member 14. From this position, the manipulations of the elongated member 14 may be repeated in the rotation cycle in order to further adjust the attitude of the spacecraft 10. Furthermore, the order of the manipulations of the elongated member 14 may be reversed to undo the angular change 30 of the spacecraft 10.

FIG. 8 illustrates a trajectory plot of key state vectors during the different phases shown in FIGS. 4-7. Specifically, FIG. 8 illustrates a chart showing the angle of the elongated member 14 (32), the angle of the spacecraft 10 (34), and the length of the elongated member 14 (36) as the elongated member 14 is manipulated through the rotation cycle illustrated in FIGS. 4-7 and 10. Position A on the chart corresponds to the position of the spacecraft 10 and elongated member 14 illustrated in FIG. 4. Position B on the chart corresponds to the position of the spacecraft 10 and elongated member 14 illustrated in FIG. 5. Position C on the chart corresponds to the position of the spacecraft 10 and elongated member 14 illustrated in FIG. 6. Position D on the chart corresponds to the position of the spacecraft 10 and elongated member 14 illustrated in FIG. 7. Position E on the chart corresponds to the position of the spacecraft 10 and elongated member 14 illustrated in FIG. 10.

Figures 11, 12, 13:
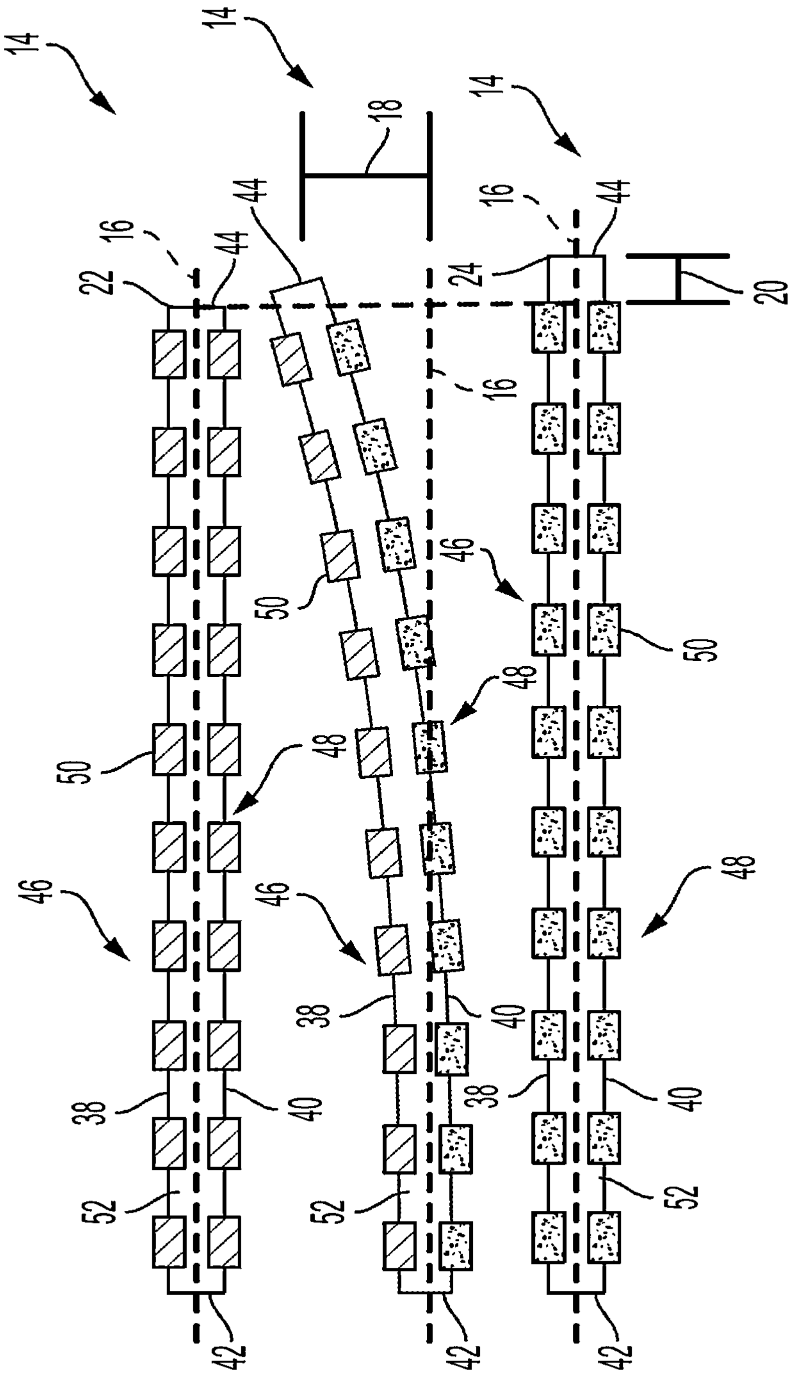
FIGS. 11-13 illustrate cross-sectional views of a third example of an elongated member and a plurality of actuators in different positions.

FIGS. 11-13 illustrate cross-sectional views of the elongated member 14 and actuators 46, 48 in different positions. In some embodiments, the elongated member 14 may have a first side 38 and a second side 40 opposed from the first side 38. The first side 38 and the second side 40 may be any portion of the elongated member 14 which faces toward or away from the direction of deflection 18. The first side 38 of the elongated member 14 may include a first actuator 46. As illustrated in FIGS. 11-13, the first actuator 46 may include an array of several actuation elements 50 embedded within the first side 38 of the elongated member 14. The actuation elements 50 may be any devices which, when embedded within a substrate 52 of the elongated member 14, may exert a force to extend or compress the elongated member 14. Examples of the actuation elements 50 may include piezoelectric actuators and electromagnetic linear actuators. Similarly, the second side 40 of the elongated member 14 may include a second actuator 48. The second actuator 48 may also include an array of several actuation elements 50 embedded within the second side 40 of the elongated member 14.

The elongated member 14 may extend from a base 42 to an end 44. The base 42 may be any portion of the elongated member 14 which is coupled to the body 12. The end 44 may be any portion of the elongated member 14 which free to deflect in at least one degree of freedom. The substrate 52 may be any material which surrounds the actuation elements 50 and makes up the structure of the elongated member 14. Examples of the substrate 52 may include a column, a tube, and a pillar. Expansion of several of the actuation elements 50 spaced along the length of the elongated member 14 may exert a force on the substrate 52 to extend the elongated member. Alternatively, contraction of several of the actuation elements 50 spaced along the length of the elongated member 14 may exert a force on the substrate 52 to compress the elongated member 14.

As illustrated in FIG. 11, when both the first actuator 46 and the second actuator 48 are contracted, the elongated member 14 may be at its initial length 22. Alternatively, where the actuation elements 50 are only capable of expansion, the elongated member 14 may be at its initial length 22 when the first actuator 46 and the second actuator 48 are inactive.

As illustrated in FIG. 12, when the first actuator 46 is inactive or is contracting while the second actuator 48 is expanding, a deflection 18 may occur at the end 44 of the elongated member 14, toward the first side 38. Alternatively, when the first actuator 46 is expanding while the second actuator 48 is inactive or contracting, a deflection 18 may occur at the end 44 of the elongated member 14, toward the second side 40.

As illustrated in FIG. 13, when the first actuator 46 and the second actuator 48 are both expanding, the length of the elongated member 14 may be extended to the altered length 24. Alternatively, where the first actuator 46 and the second actuator 48 are both contracting, the length of the elongated member 14 may be compressed to the altered length 24.

In some embodiments, the actuation elements 50 are electrically operated and may be responsive to exert a range of forces on the substrate in response to a range of electrical currents. For example, a maximum force which may be exerted in some embodiments may be 200 N for each actuation element 50. A maximum electrical current may create this force in every actuation element 50 on one of the actuators 46, 48 to achieve the maximum possible deflection 18. Alternatively, smaller deflections may be achieved by using less electrical current or by activating only a portion of the actuation elements 50 within one of the actuators 46, 48.

Figure 14:
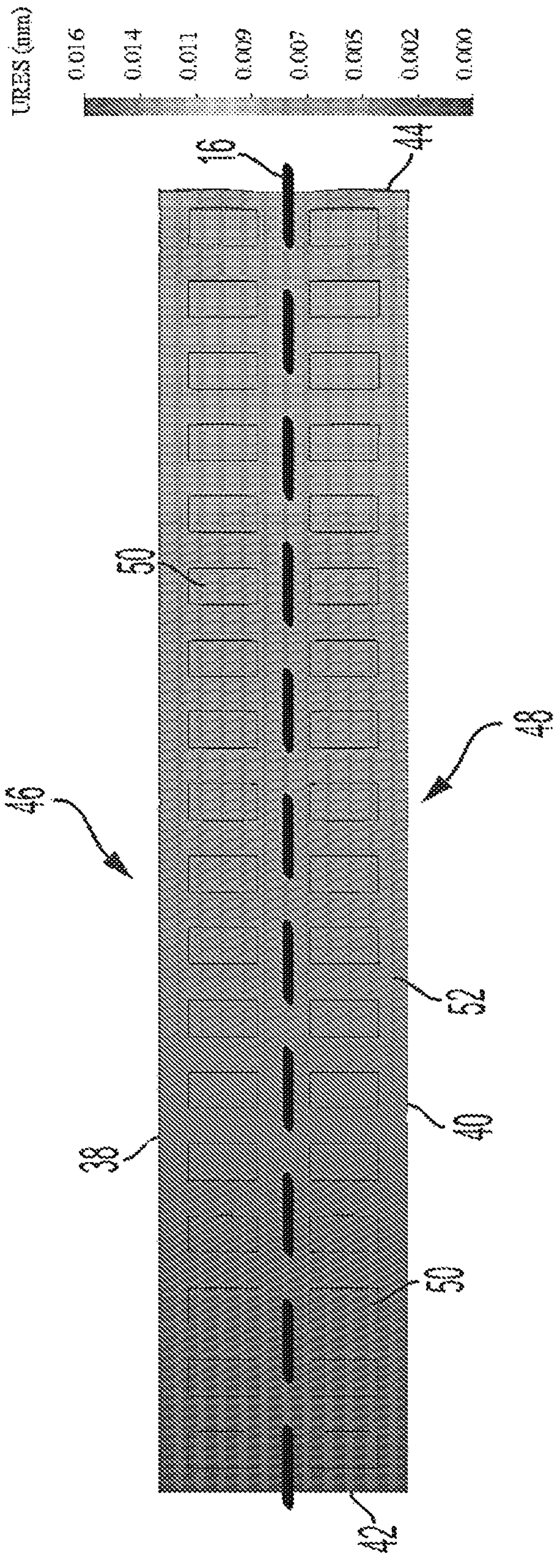
FIG. 14 illustrates a cross-sectional view of a fourth example of an elongated member in an undeflected position.
Figure 15:
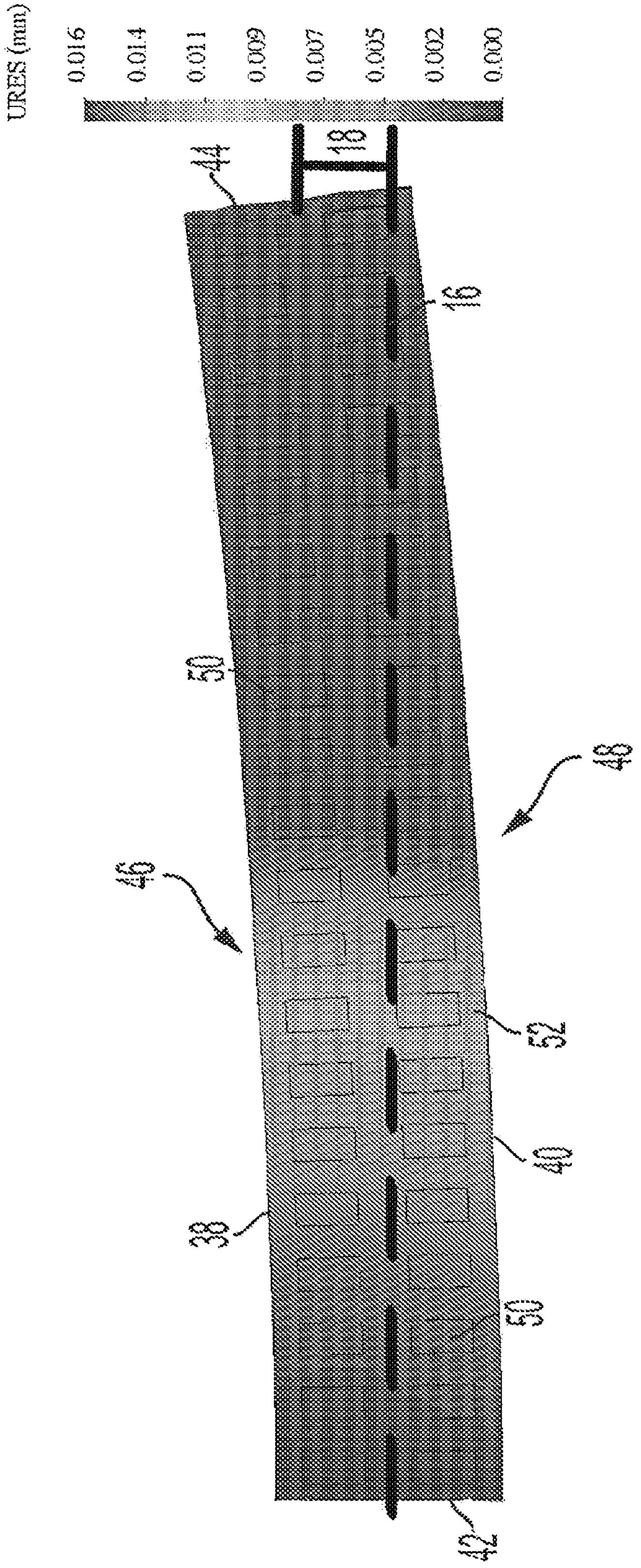
FIG. 15 illustrates a cross-sectional view of the example of an elongated member of FIG. 14 in a deflected position.

FIGS. 14 and 15 illustrate a partial cross-sectional view of the elongated member 14 having actuation elements 50 embedded within the substrate 52 of the elongated member 14. In such an embodiment, the material of the substrate 52 may be any material which is sufficiently rigid to hold its shape, but which is compliant enough to extend or compress in response to actuation by the actuators 46, 48. An example of such a material may be Aluminum 6061-T4.

Figure 16:
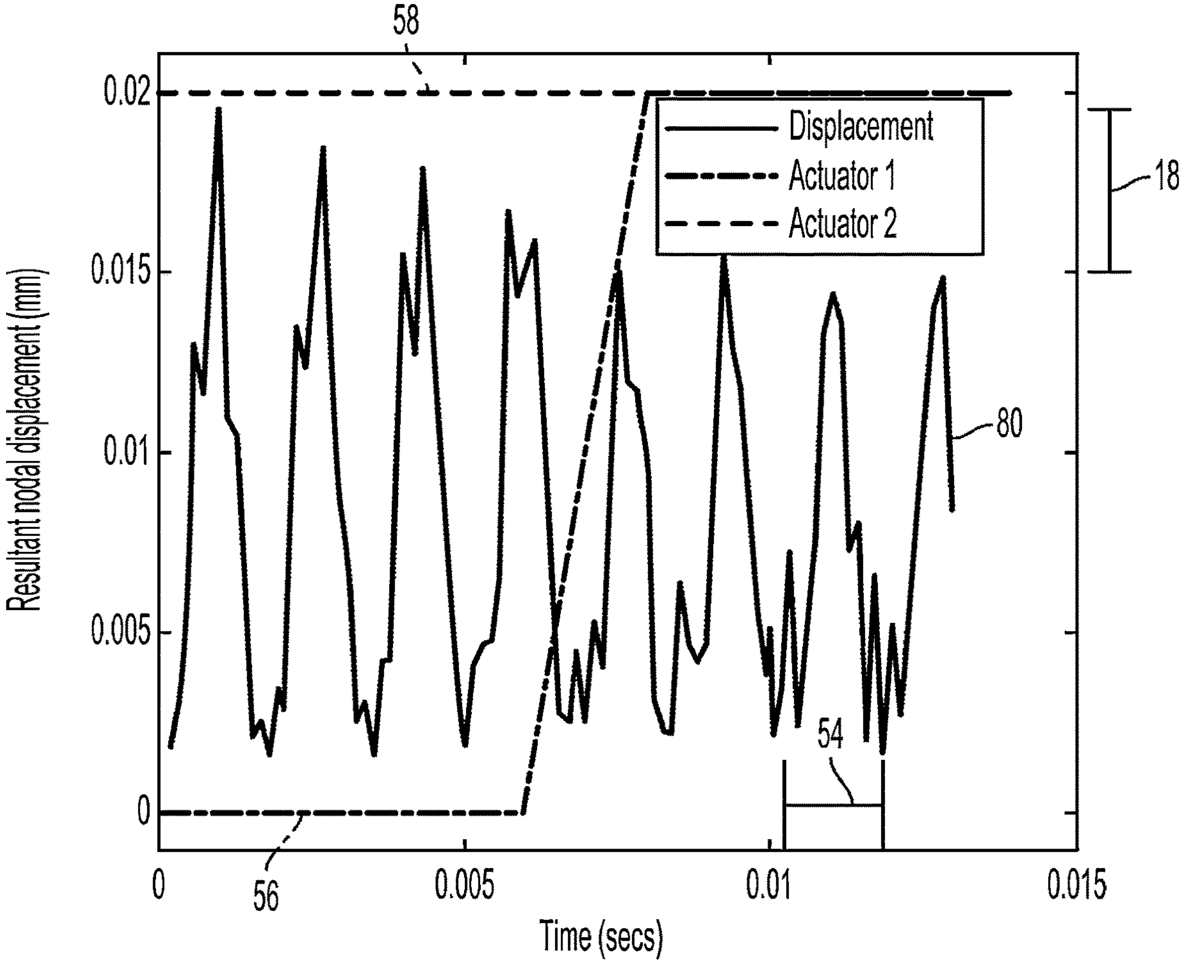
FIG. 16 illustrates a chart indicating displacement of the elongated member of FIGS. 14 and 15 and the positions of a first actuator and a second actuator.

FIG. 16 illustrates a chart showing the deflection 18 of the elongated member 14 relative to the activation of the first actuator 46 or the second actuator 48. Even within force from the actuators 46, 48, the movement 80 of the elongated member 14 oscillates according to the natural frequency 54 of the elongated member 14. The amplitude of the oscillation may change responsive to activation of the first actuator 46, resulting in a deflection 20. In such an embodiment, the deflection 20 in the length of the elongated member may be small, an extension of about 0.1% of the initial length 22. However, a significant attitude adjustment to the spacecraft 10 may be possible by conducting the rotation cycle using small manipulations at a high frequency. For example, the amplitude of the deflection 18 may be maximized for the embodiment shown in FIGS. 14-16 by performing the rotation cycle at a rate at or around the natural frequency 54 of the elongated member 14, in this embodiment, estimated to be about 4 kHz.

Furthermore, in some embodiments, the natural frequency 54 of the elongated member 14 may be tuned for a target deflection 18 and frequency at which the rotation cycle is conducted. For example, in some embodiments, the elongated member 14 may include a tensegrity structure. The tensegrity structure may be any structure of rigid components, such as pillars, struts, or rods, coupled together through tensioned elements such as cables or wires. An additional actuator 46, 48, may be embedded within rigid components or the tensioned elements of the tensegrity structure to alter the natural frequency 54 of the elongated member 14. Alteration of the natural frequency 54 of the elongated member 14 may allow the actuators 46, 48 to be tuned to repeat the rotation cycle at a rate to match the natural frequency 54 of the elongated member 14 and therefore maximize deflection 18 and angular change 30 of the spacecraft 10.

In other embodiments, the shape of the elongated member 14 may be altered to change the natural frequency 54. For example, pre-formed holes may be arranged within the substrate 52 of the elongated member 14 to increase the deflection 18 and also to tune the natural frequency 54 to a desirable frequency. In other examples, a thickness of the elongated member 14 may alter at the length of the elongated member 14 changes. Changes in thickness may be used to tune the mass moment of inertia of the elongated member 14, to tune the deflection 18 of the elongated member 14 in the rotation cycle, and to tune the natural frequency of the elongated member 14.

Figure 17:
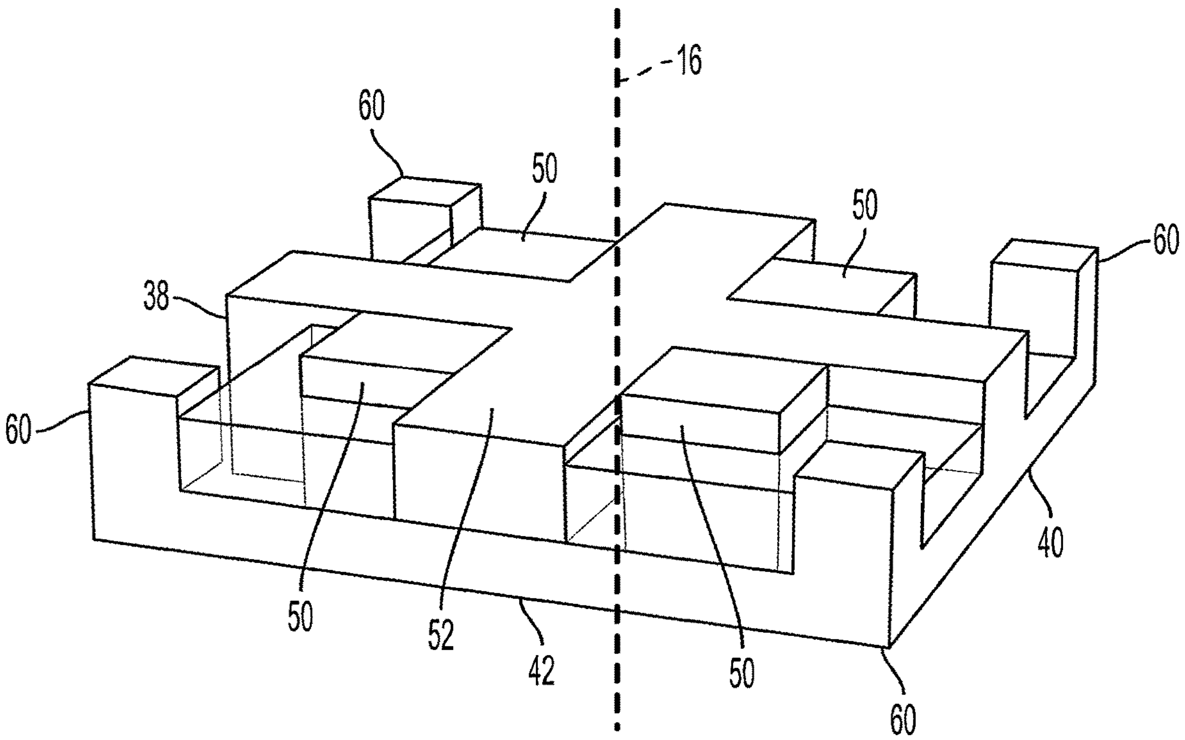
FIG. 17 illustrates a partial cross-sectional orthogonal view of a fifth example of the elongated member.

FIG. 17 illustrates a perspective view of a cross-sectional portion of the elongated member 14. The elongated member 14 may comprise geometric prism having multiple corners 60 and a base 42 coupled to the body 12 of the spacecraft 10. As illustrated in FIG. 17 the geometric prism of the elongated member 14 may have four corners 60 and four sides, but other configurations may be possible. Each of the actuation elements 50 may be positioned proximate to one of the corners 60. The substrate 52 of the elongated member 14 may ensure that the actuation elements 50 are sufficiently spaced apart.

In the embodiment shown in FIG. 17, a variety of deflections 18 from the axis 16 may be possible using different combinations of actuators. For example, expansion of the actuation elements 50 closest to the first side 38 may produce a deflection 18 of the end 44 toward the second side 40. Alternatively, any contraction of any two adjacent actuation elements 50 may produce a deflection 18 on the same side as those adjacent actuation elements 50. Furthermore, combinations of expansions and contractions of non-adjacent actuation elements 50 may be able to produce deflections 18 controllable in two or more degrees of freedom, or a twisting motion of the elongated member 14 about the axis 16.

Figure 18:
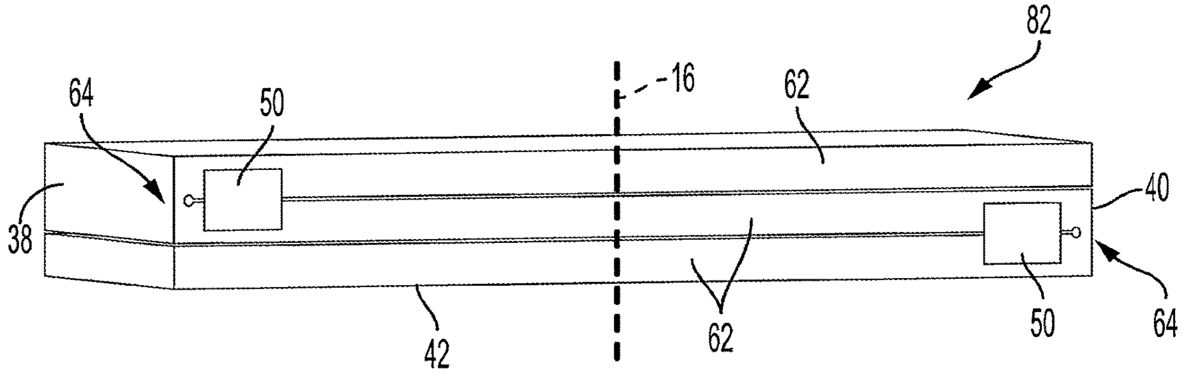
FIG. 18 illustrates a perspective view of a sixth example of an elongated member in an undeflected position.
Figure 19:
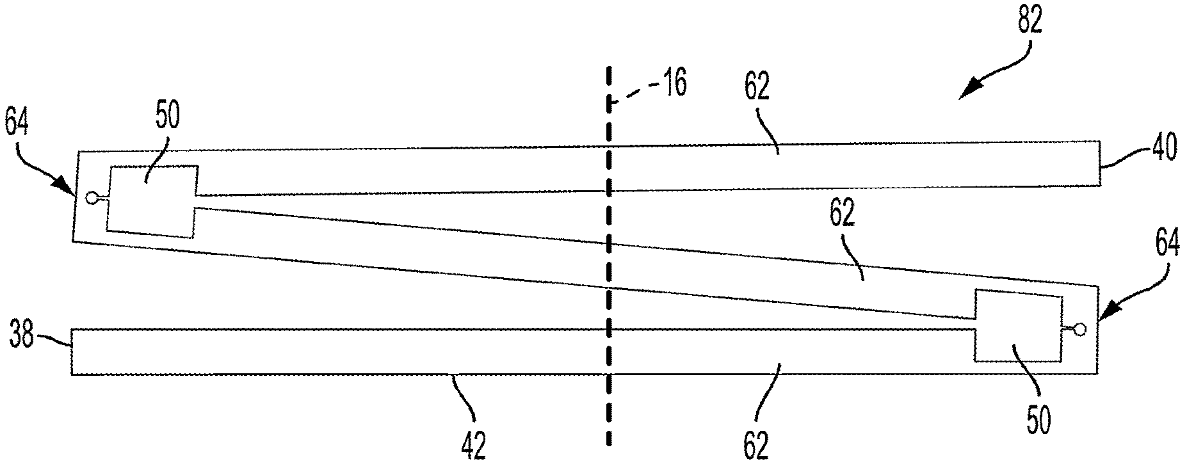
FIG. 19 illustrates a side cross-sectional view of the example of the elongated member shown in FIG. 18 in a deflected position.

FIG. 18 illustrates a perspective view of an alternative embodiment of the elongated member 14 in an undeflected position. In some embodiments the elongated member 14, or actuation elements 50 within the elongated member 14 may include a lever mechanism 82 for expanding or contracting the elongated member 14. The lever mechanism 82 may be any device which is able to amplify the expansive or contraction of an actuation element 50. For example, as illustrated in FIG. 18, the lever mechanism 82 may include several struts 62 extending from the first side 38 to the second side 40 and stacking upon one another. In some embodiments, adjacent struts 62 may be coupled to each other at a joints 64 located at either the first side 38 or the second side 40. The struts 62 may be coupled at joints 64 formed alternatingly on the first side 38 and the second side 40 such that when the lever mechanism 82 is expanded (as illustrated in FIG. 19), the struts 62 form a continuous path extending from the base 42 and alternating between the first side 38 and the second side 40. While stacked struts and their respective actuators are described herein, it will be understood that other arrangements of struts and actuators are possible and contemplated.

The lever mechanism 82 may also include several actuation elements 50 capable of expanding or contracting the lever mechanism 82. Each of the actuation elements 50 may be positioned between adjacent struts 62 proximate to one of the joints 64. The actuation elements 50 may be partially embedded between two adjacent struts 62 and may be located inward from the joint 64 at the respective first side 38 or second side 40. In some embodiments, the actuation elements 50 may be located at close to the joints 64 as possible to maximize the deflection 18 of the lever mechanism 82.

The length of the struts 62 may also be used to amplify the expansion or contraction of the lever mechanism 82. For example, the lever mechanism may be capable of amplifying expansion of the actuation elements by a factor of 50, in excess of a 1% extension of the elongated member 14. However, the force of the lever output may be reduced by the same factor. The lever mechanism 82 may have high stresses due from amplifying the expansion of the actuation elements 50. Therefore, the struts 62 may be made from a strong metal capable of withstanding high stress, such as ANSI-4030 steel.

In some embodiments, the lever mechanism 82 may be the elongated member 14. In such embodiments, deflection 18 of the elongated member 14 may be achieved in a variety of ways. For example, expansion of all of the actuation elements 50 may cause a deflection 20 in length of the elongated member 14. Alternatively, expansion of the actuation elements 50 which are proximate to joints 64 only on the first side 38 may cause a deflection 18 toward the second side 40. Similarly, contraction of the actuation elements 50 which are proximate to joints 64 only on the second side 40 may also cause a deflection 18 toward the second side 40.

Figure 20:
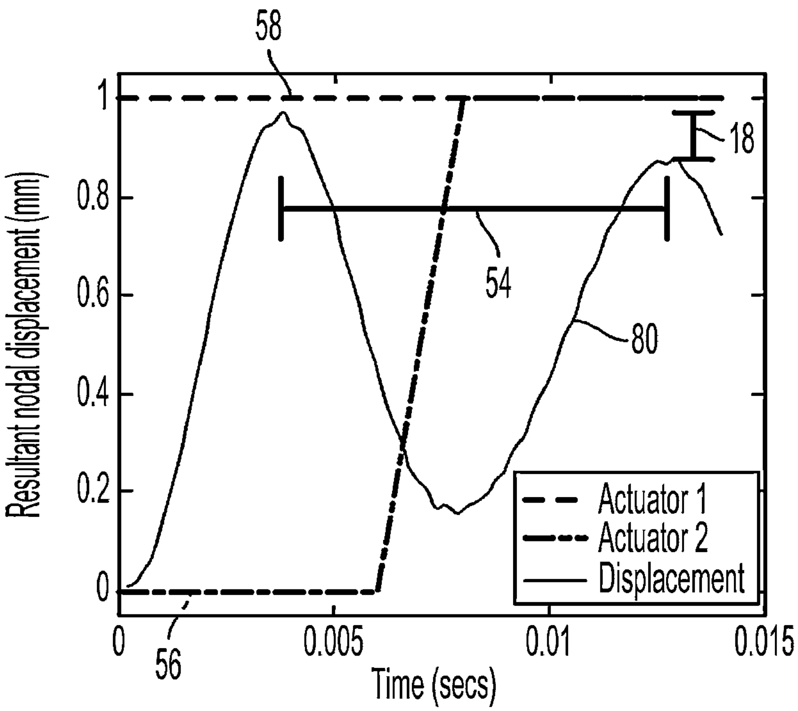
FIG. 20 illustrates a chart indicating displacement of the elongated member of FIGS. 18 and 19 and the positions of a first actuator and a second actuator.

FIG. 20 illustrates a chart showing the deflection 18 of the elongated member 14 in the form of the lever mechanism 82. The first actuator 46 may include the array of actuation elements 50 which are proximate to joints 64 only on the first side 38. The second actuator 48 may include the array of actuation elements 50 which are proximate to joints 64 only on the second side 40. Even within force from the actuators 56, 58, the movement 80 of the elongated member 14 oscillates according to the natural frequency 54 of the elongated member 14. The amplitude of the oscillation may change responsive to activation of the first actuator 46, resulting in a deflection 18. In such an embodiment, the deflection 20 in the length of the elongated member may be larger than the embodiment shown in FIG. 14, an extension of up to 1.0% of the initial length 22. However, a significant attitude adjustment to the spacecraft 10 may be possible by conducting the rotation cycle using small manipulations at a high frequency. For example, the amplitude of the deflection 18 may be maximized for the embodiment shown in FIGS. 18 and 19 by performing the rotation cycle at a rate at or around the natural frequency 54 of the elongated member 14, in this embodiment, estimated to be about 1 kHz.

Figure 21:
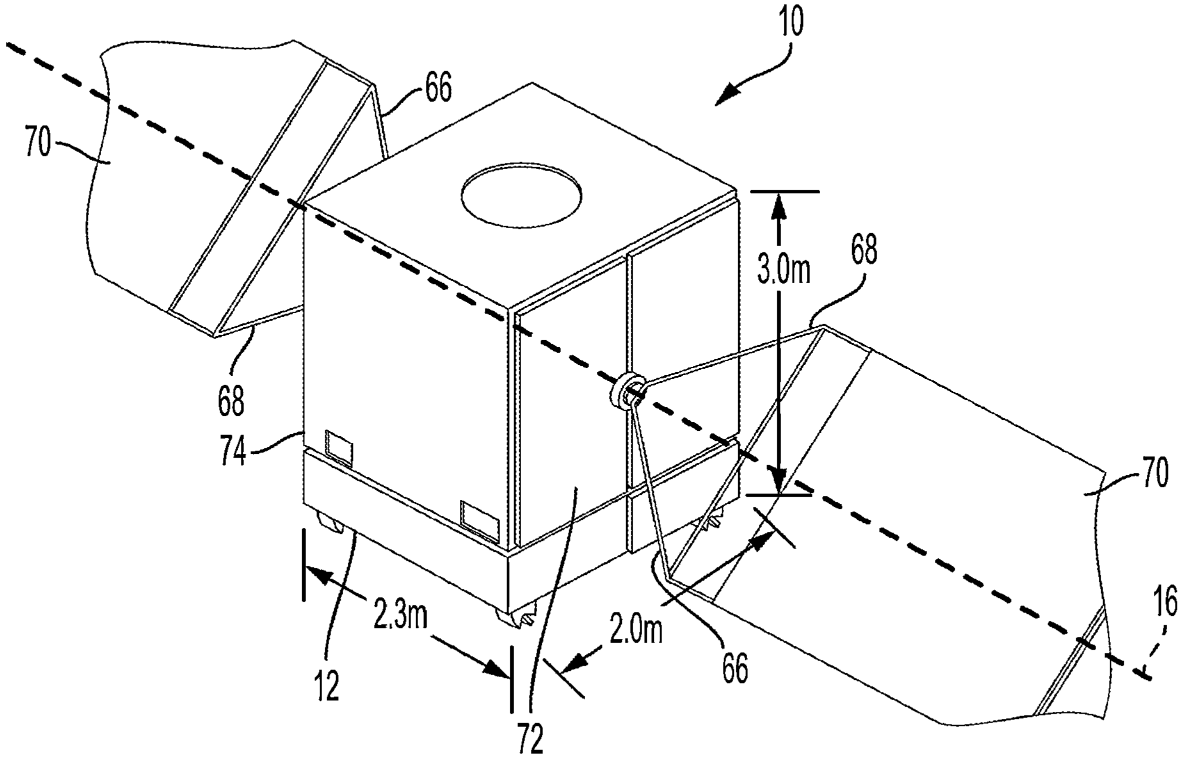
FIG. 21 illustrates a first example of a spacecraft including a body and an elongated member.

FIG. 21 illustrates an embodiment of the spacecraft 10 having two elongated members 14. A first elongated member 14 is coupled to a first side 72 of the spacecraft 10. A second elongated member is coupled to a second side 74 of the spacecraft 10 which is opposed to the first side 72 of the spacecraft 10. The elongated members 14 may both be aligned along the axis 16 such that translation caused by compression or expansion of the first elongated member 14 may be offset by corresponding compression or expansion of the second elongated member 14.

As illustrated in FIG. 21, some embodiments of the elongated member 14 may include a solar panel 70. The solar panel 70 may be any component of the spacecraft 10 which is configured to absorb electromagnetic radiation and convert absorbed radiation into electrical energy. Electrical energy from the solar panel 70 may be used to activate the actuators 46, 48 as well as to perform many other functions on the spacecraft 10. In some embodiments, the actuators 46, 48 may be embedded within the solar panel 70 to create the deflection 18 of the elongated member 14.

Alternatively, as illustrated in FIG. 21, the elongated member 14 may include a first spar 66 and a second spar 68. The first spar 66 and the second spar 68 may each extend from the body 12 of the spacecraft 10 to the solar panel 70. Each of the first spar 66 and the second spar 68 may be offset from the axis 16 at opposing angles, defining a plane extending through the axis 16, the first spar 66, the second spar 68, and the solar panel 70. A first actuator 46 may be embedded within the first spar 66 and a second actuator 48 may be embedded within the second spar 68.

In such an embodiment, the first actuator 46 and the second actuator 48 may be used to produce a variety of deflections 18 of the elongated member 14. For example, the first actuator 46 could extend the length of the first spar 66 and the second actuator 48 could extend the length of the second spar 68 to produce a lengthening deflection 20 of the elongated member 14. Alternatively, the first actuator 46 could deflect the first spar 66 out of the plane and the second actuator 48 could deflect the second spar 68 out of the plane in the same direction, producing a deflection 18 out of the plane by the elongated member 14. Similarly, the first actuator 46 could deflect the first spar 66 out of the plane in a first direction and the second actuator 48 could deflect the second spar 68 out of the plane in a second direction different from the first spar 66, producing a twist of the elongated member 14 about the axis 16.

These manipulations of the first spar 66 and the second spar 68 can be used in the rotation cycle to produce a secular angular change 30 in the attitude of the spacecraft 10. This angular change 30 can be amplified by having elongated members 14 on opposing sides perform the rotation cycle in unison. Furthermore, in some embodiments, more spars 66, 68 and other elements may be added to the elongated member 14 to produce deflection 18 in additional degrees of freedom.

Figure 22:
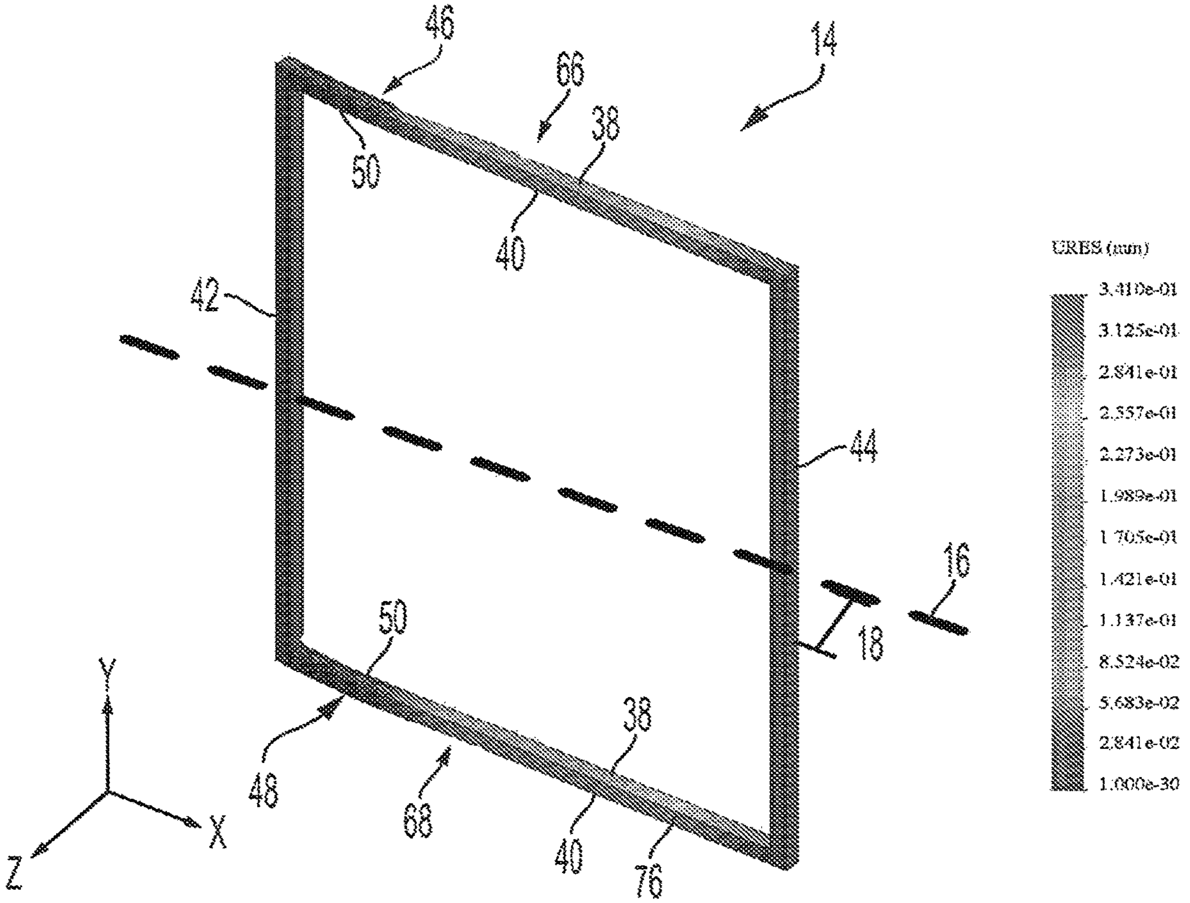
FIG. 22 illustrates a seventh example of the elongated member in a first deflected position.

FIG. 22 illustrates an alternative shape for the elongated member 14. The elongated member 14 may have a variety of shapes such an empty rectangular frame, an ellipsoid, or a complex polyhedron. As illustrated in FIG. 22, the axis 16 may bisect the elongated member 14 while the elongated member 14 is at rest. Additionally, while the rectangular elongated member 14 is at rest, the entire elongated member 14 may lie within a plane passing through the axis 16. As illustrated in FIG. 22 the plane of the elongated member may lie on the X and Y axes. The rectangular elongated member 14 may include the first spar 66 and the second spar 68 extending from the base 42 to the end 44. Furthermore, the first spar 66 and the second spar 68 may be separated by the base 42 and the end 44. The first actuator 46 may be embedded within the first spar 66. The second actuator 48 may be embedded within the second spar 68.

In such an embodiment, the first actuator 46 and the second actuator 48 may be used to produce a variety of deflections 18 of the elongated member 14. For example, as shown in FIG. 22, the first actuator 46 could deflect the first spar 66 out of the plane along the Z-axis and the second actuator 48 could also deflect the second spar 68 out of the plane in the Z-axis, producing a deflection 18 out of the plane along the Z-axis by the elongated member 14. Such a deflection 18 may result in an angular change 30 in the attitude of the spacecraft 10 about the Y-axis.

Alternatively, as shown in FIG. 22, the first actuator 46 could deflect the first spar 66 across the plane along the Y-axis and the second actuator 48 could also deflect the second spar 68 across the plane along the Y-axis. Such a deflection 18 may result in an angular change 30 in the attitude of the spacecraft 10 about the Z-axis.

In some embodiments, the effective mass moment of inertia of the elongated member 14 may be altered without changing the length of the elongated member 14. For example, as shown in FIG. 22, a deflection 18 toward the Z-axis, may increase the effective length of the elongated member 14 with respect to the Z-axis and decrease the effective length of the elongated member 14 with respect to the X-axis. This change would increase the mass moment of inertia of the elongated member 14 for further rotations about the X-axis, and would decrease the mass moment of inertia for the elongated member 14 for further rotations about the Z-axis and would decrease the mass moment of inertia of the elongated member 14 for further rotations about the X-axis. Using a combination of these deflections, the rotation cycle can be completed, implementing a secular angular change 30 in the spacecraft, without changing the length of the elongated member 14.

Figure 23:
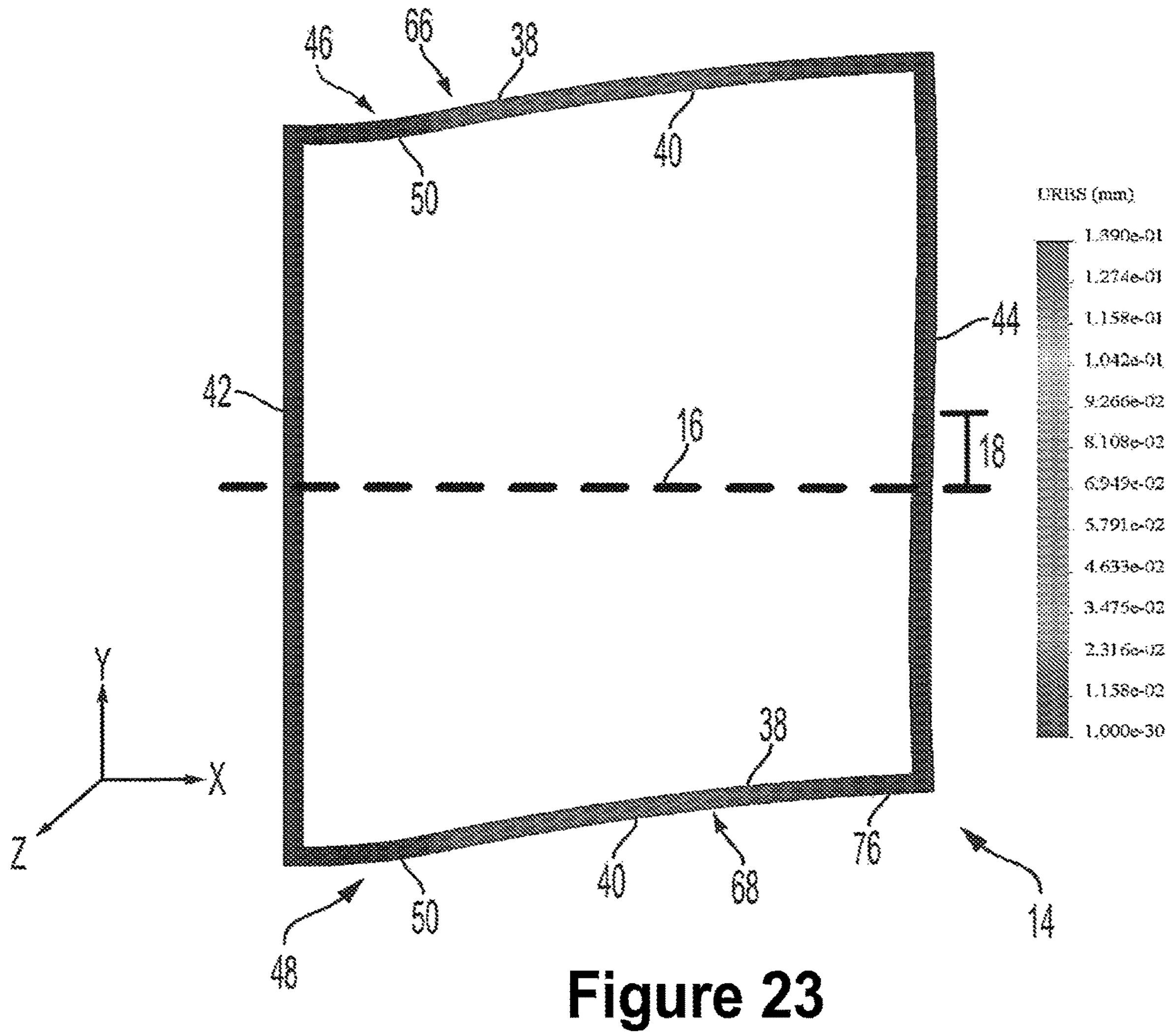
FIG. 23 illustrates the example of the elongated member of FIG. 22 in a second deflected position.
Figure 24:
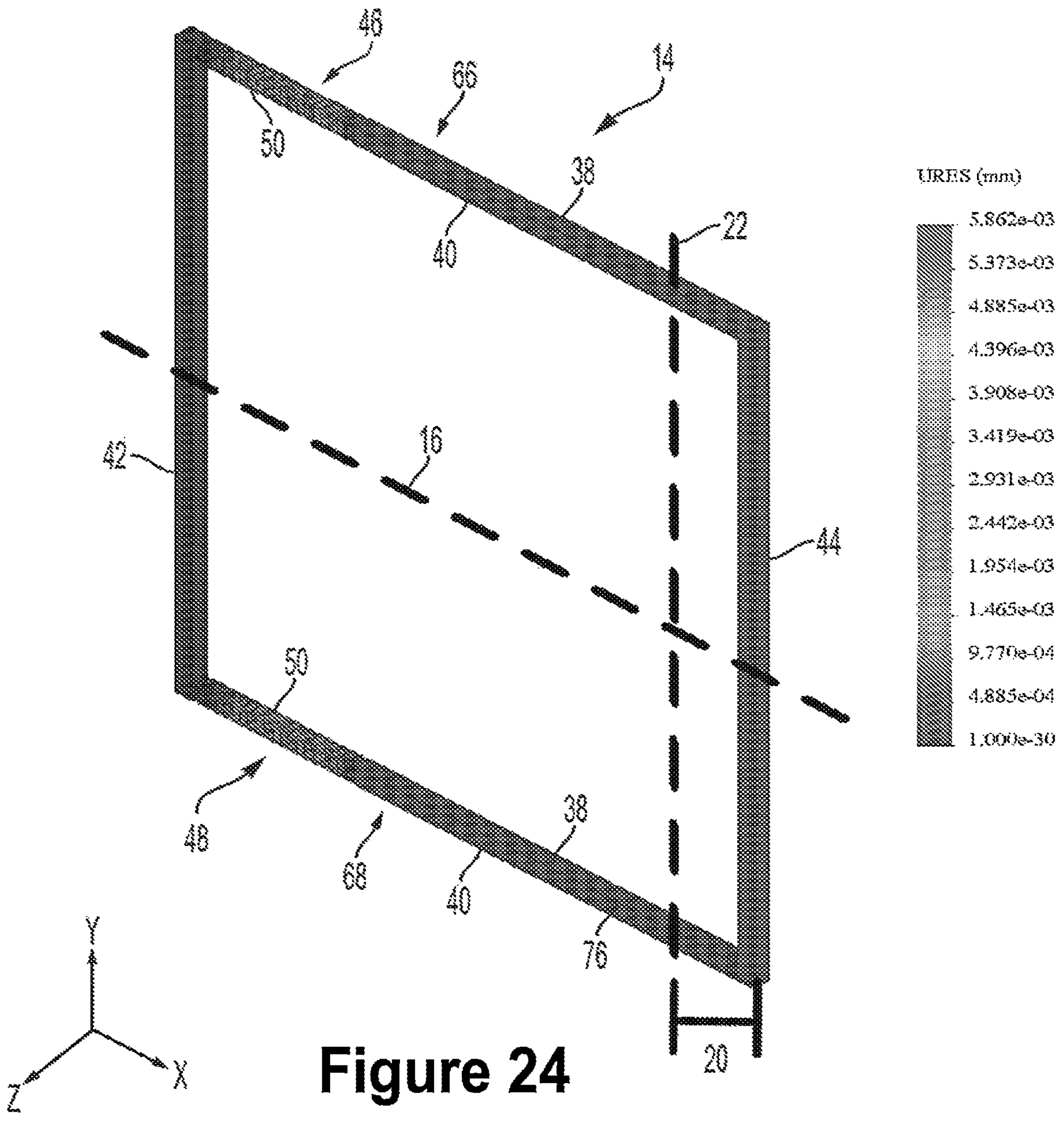
FIG. 24 illustrates the example of the elongated member of FIGS. 22 and 23 in a third deflected position.

Furthermore, as shown in FIG. 23, the first actuator 46 could extend the length of the first spar 66 along the X-axis and the second actuator 48 could also extend the length of the second spar 68 along the X-axis to produce a lengthening deflection 20 of the elongated member 14. Such a deflection 20 may result in a translation of the spacecraft 10 in an opposing direction.

Similarly, the first actuator 46 could deflect the first spar 66 out of the plane along the Z-axis in a first direction and the second actuator 48 could deflect the second spar 68 out of the plane along the Z-axis in a second direction different from the first spar 66, producing a twist of the elongated member 14 about the axis 16. Such a twist may result in a twist of the spacecraft 10 about the axis 16 in an opposing direction.

d. Lumped MSAC Prototype

The system described here is a bulk, low-cost, low-fidelity version to be used to explore the theory and assumptions and develop more refined prototyping and testing methods around MSAC as described herein. It is a hardware-in-the-loop (HIL) device, which gives more realistic and useful data than a simulation, including reproducing the physical maneuvers expected from MSAC.

The prototype and testbed described herein are at the low-fidelity, HIL phase (i.e., the first serious testing phase after concept exploration). Many design decisions for the system will be made or refined based on data collected at this phase.

In addition to MSAC-like motion, several requirements were established for the construction of a prototype and a feasible testbed, including: 1) The prototype must be as low-cost as possible, using standard hardware and 3-D printed parts for as much of the construction as possible; 2) The panels must move in a controllable way; 3) There must be no wires or cables to the ground (i.e., the prototype must effectively float and have self-contained power and controllers); 4) The testbed must be simple and low-cost while being model-friendly; 5) Testing must be done in a clean environment.

These were all satisfied during the design and building of the prototype and testbed, as shown in the following sections. Requirement 1 imposed several other sub-requirements, including that no individual part could be larger than the print area of the largest printer available (i.e., 200 mm×220 mm×180 mm), that the hardware all had to be commercial off-the-shelf (COTS), and that printing direction and part density must be considered in design as it can affect the structural integrity of the prototype.

Figure 25B:
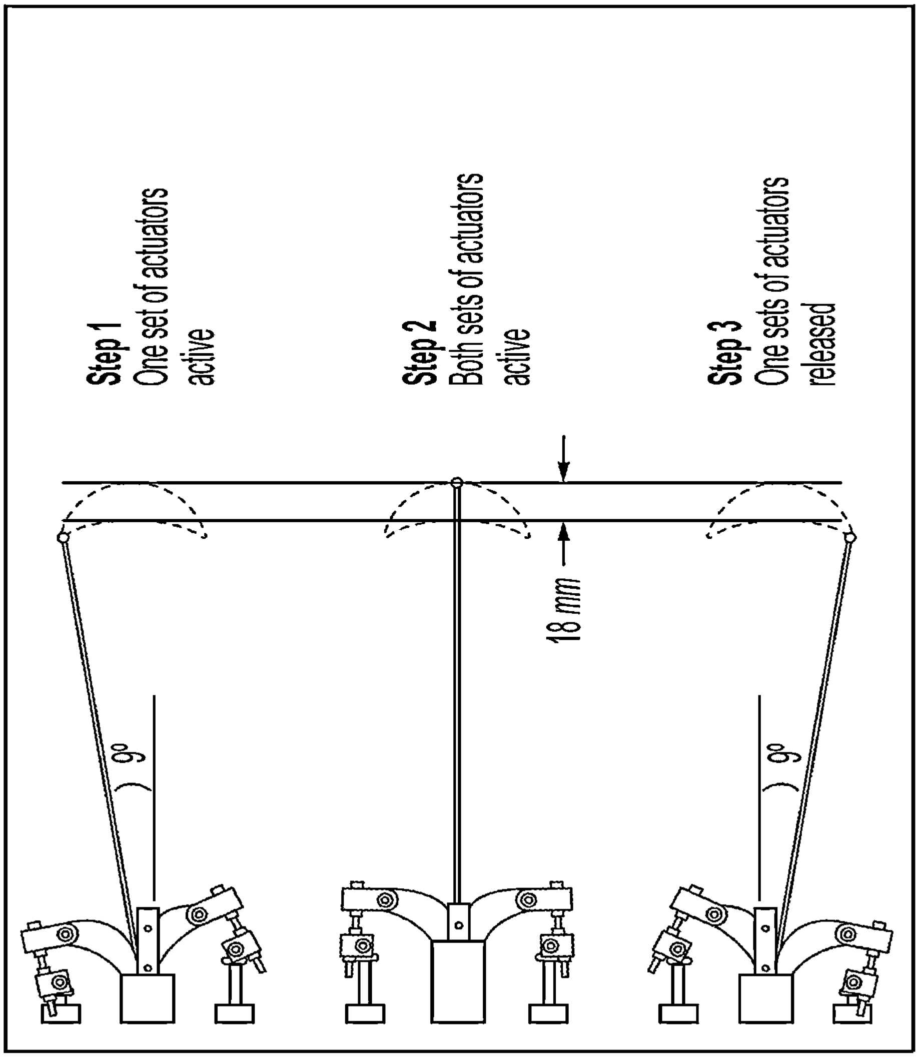
FIG. 25B illustrates panel motion, according to an example embodiment.
Figure 25A:
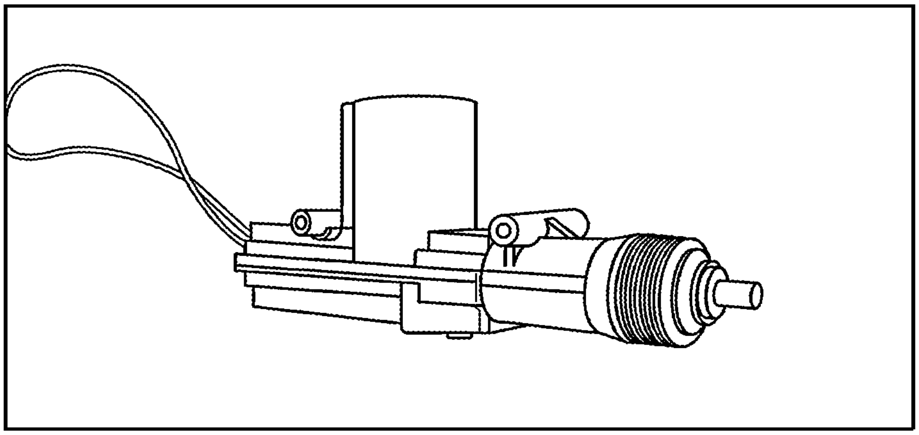
FIG. 25A illustrates an actuator, according to an example embodiment.

Due to the freedom and low cost provided by using mainly 3-D printed plastic components, the most vital design decision was the method for moving the panels during operation. It was decided that linear electric actuators would be used, as they are reliable, powerful, and low cost. After investigating the cost and type needed, it became clear that automatic car door locking actuators (FIG. 25*a*) was the best option, as they are fast-acting, strong, and less than 5% of the cost of screw-driven, two-way actuators. While these are limited as one-way push actuators, a series of them working together can accomplish the desired panel motion, illustrated in FIG. 25*b*. The reason for choosing the actuators was the cost and lead time for the actuators. Due to the dynamics of the actuators, only open-loop discrete bang-bang control can be used for the HIL tests of the lumped MSAC prototype.

The remaining design mechanics decisions were simple, as they revolved around accommodating the motion of these actuators, making the main bus as light as possible, and ensuring that none of the 3-D printed parts were too large for the available machines. To this end, the main bus was broken up into three parts and then assembled (the three large yellow components in FIG. 26). All hardware used was standard COTS hardware available at a typical home improvement store.

Figure 27:
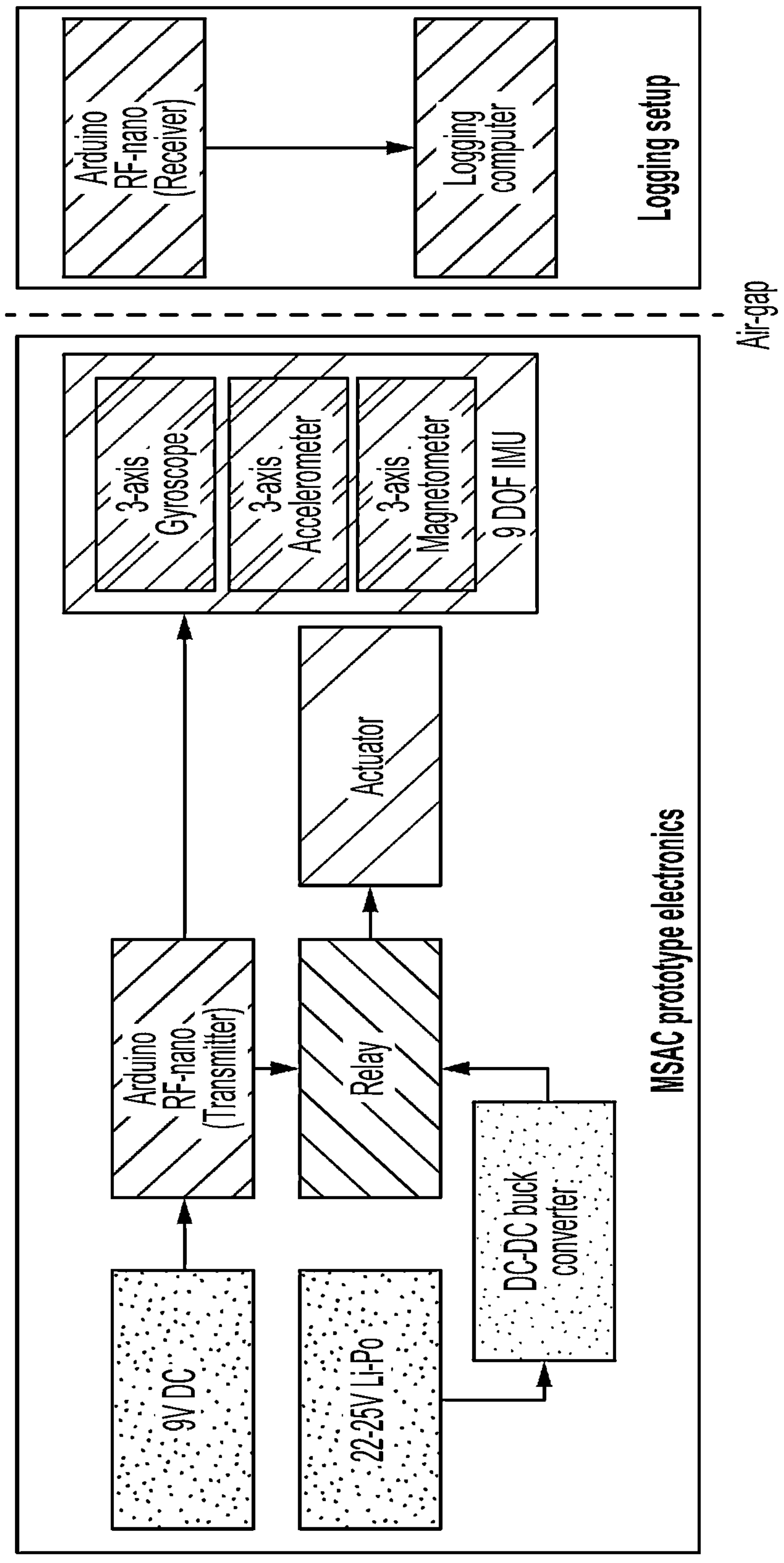
FIG. 27 illustrates a schematic electrical setup for the lumped prototype of FIG. 26.

The panels used were 3-mm polycarbonate sheets cut to a size of 6×12 inches. The final major mechanical decision was to add a steel frame to ensure that the main bus could be balanced and to prevent any cracking in the large printed main bus. The electrical components were powered using a 22-25 V lithium polymer battery. The linear actuators were supplied with 12 V 5 A power using a buck converter. All sensors and control signals operated at 5 V, provided by a 9 V COTS battery; this supply was independent of the main 22 V battery to prevent any electrical interference between the high-power and sensitive low-power instruments. An Arduino RF-nano produced all control signals and provided sensor logging. The control signals were used to switch high-speed relays to control the supply to the linear motors. The sensor data was transmitted wirelessly using an RF transceiver. The data was received using another Arduino RF-nano connected to a personal computer and was logged. A summary of the electrical setup can be seen in FIG. 27.

Figure 26:
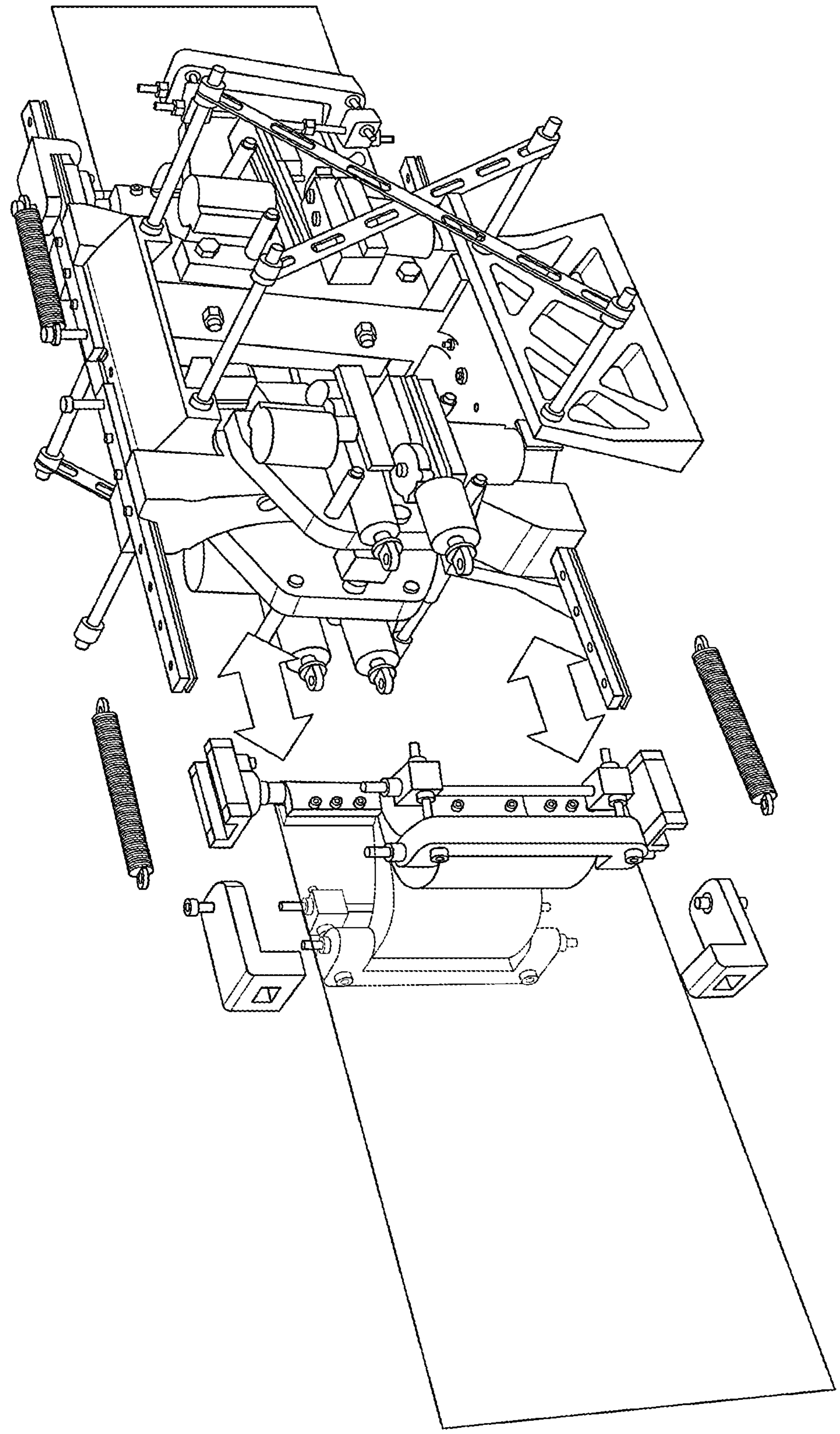
FIG. 26 illustrates a lumped prototype, according to an example embodiment.
Figure 28:
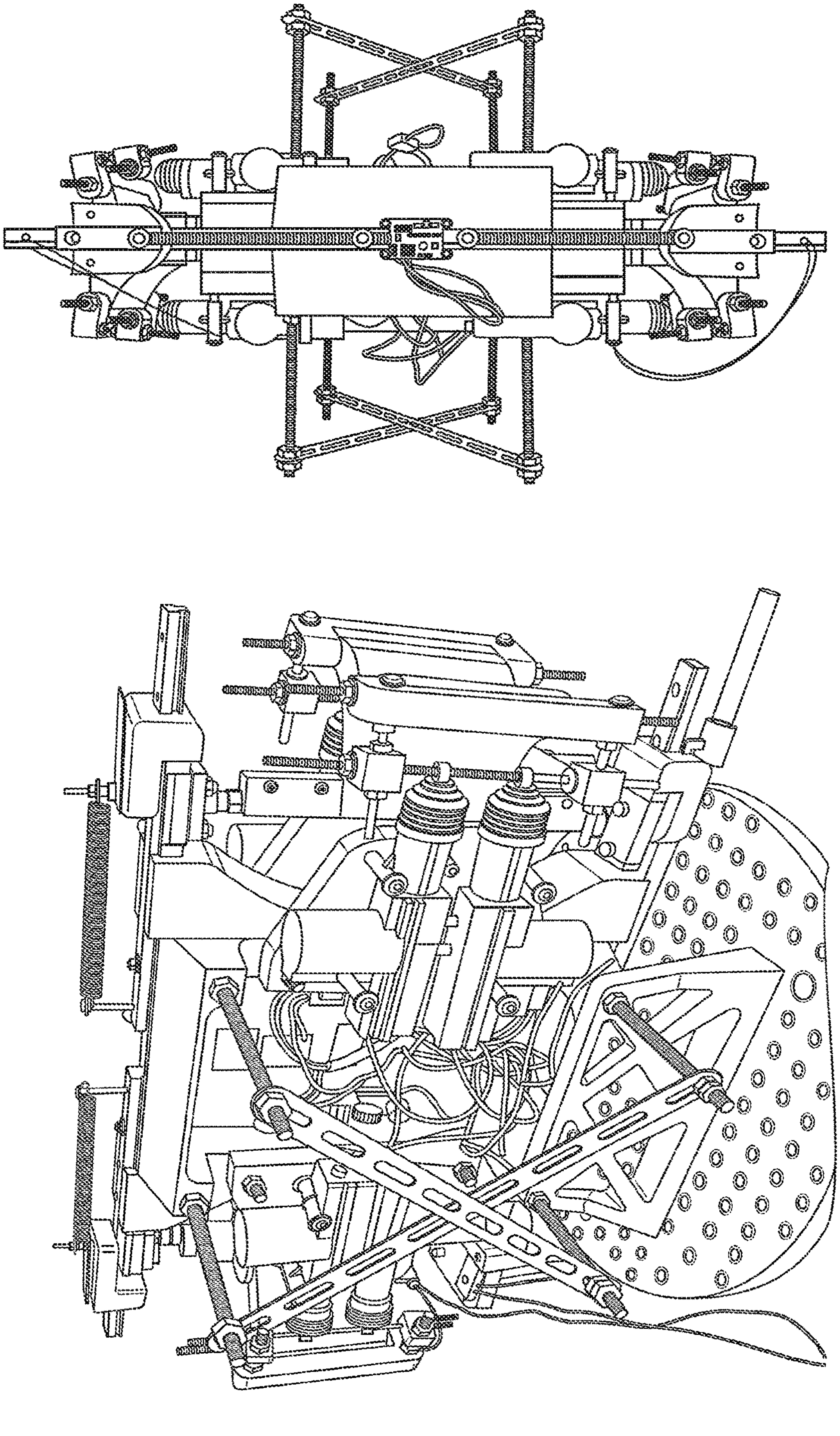
FIG. 28 illustrates views of a lumped prototype, according to an example embodiment.

A design embodiment is presented in FIG. 26, including the moving panels, main bus, etc., with the constructed prototype shown in FIG. 28. Additionally, the prototype also has a COTS nine-axis Inertial Measurement Unit (IMU) consisting of a three-axis accelerometer, magnetometer, and gyroscope to measure the attitude slews during tests. The system is powered using Lithium polymer batteries, and the sensor data is wirelessly transmitted to an external data logger. This allows for minimal external torques on the system under test and can be used in subsequent higher-fidelity tests using air bearings to minimize the contribution of friction.

e. Testbed

Figure 29:
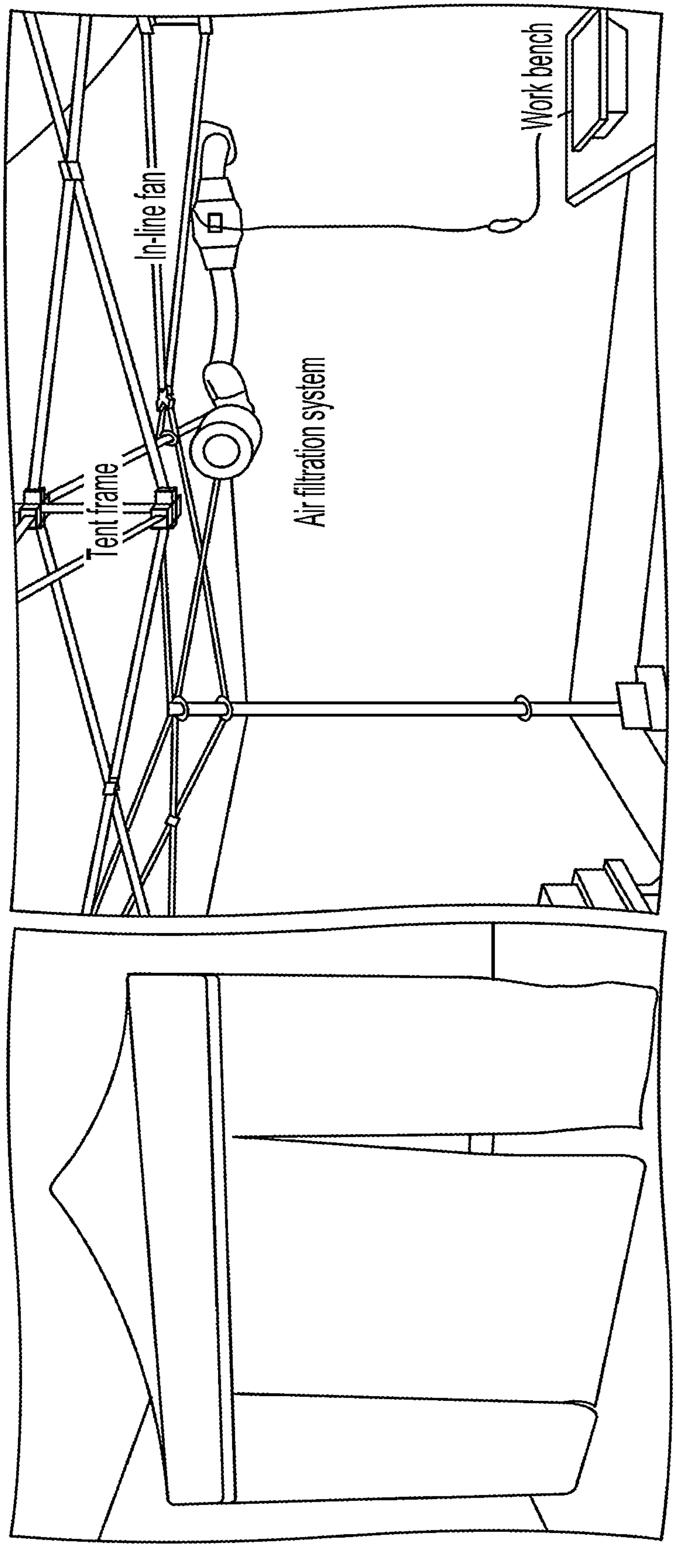
FIG. 29 illustrates a testbed environment (a) enclosing tent and (b) air filtration and pressurization system, according to an example embodiment.

The testbed was required to present a clean environment and allow the prototype to complete its mission at a low cost. To establish a clean environment, a vinyl tent was set up in a high bay area as a quasi-cleanroom (FIG. 29). The tent was lightly pressurized using an in-line fan and charcoal air filter with a diffuser to prevent air currents inside of the tent. The tent was sealed at the bottom using sandbags after setup and observed to bow out lightly from the pressure difference after about one minute of the air system running.

Figure 30:
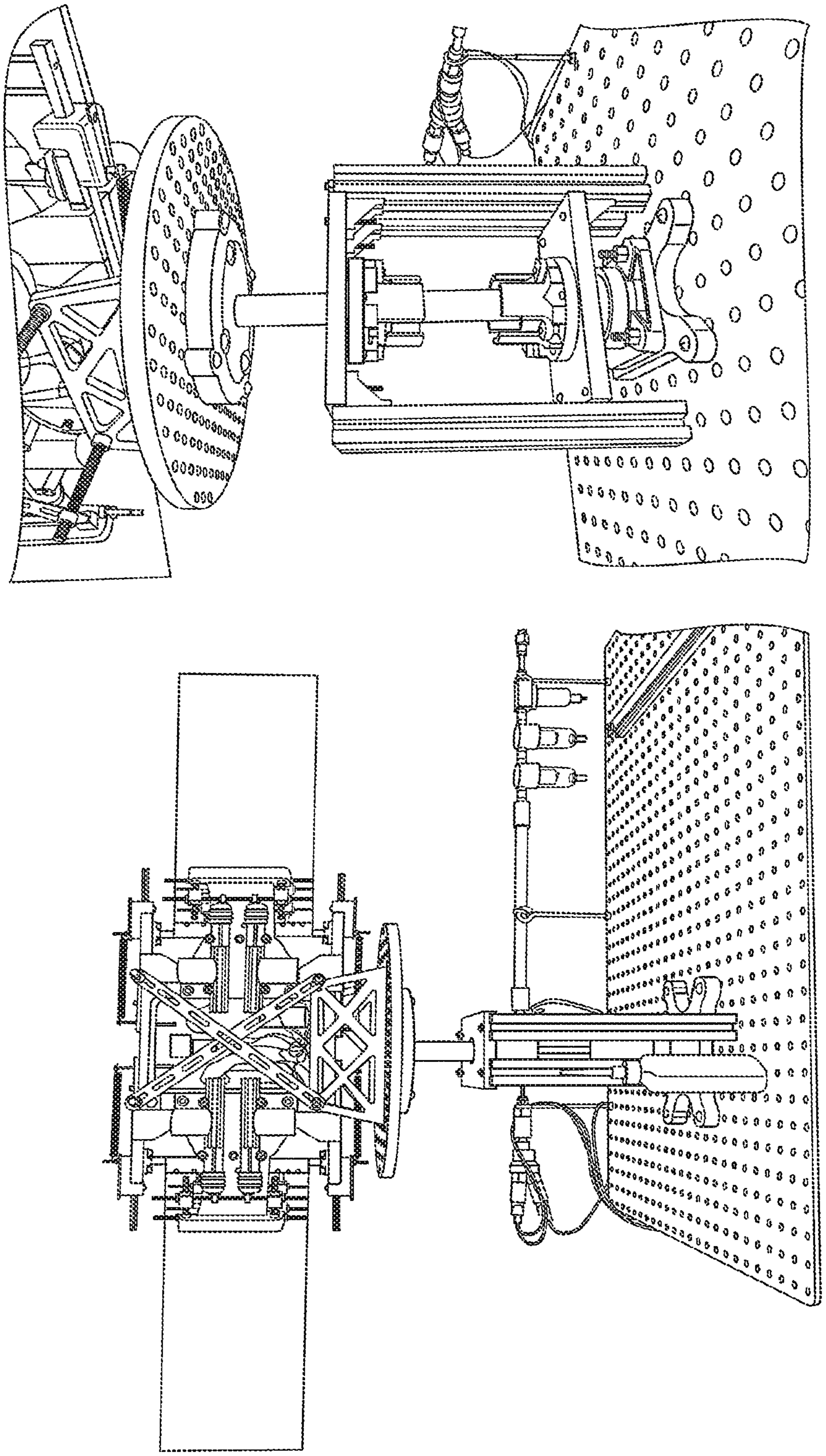
FIG. 30 illustrates a 1-D roller bearing testbed (a) overall design and (b) detailed close-up view.

To construct the test-bed itself, two flat, stable, clean surfaces were obtained: 1) an optical table, and 2) a circular optical breadboard (FIG. 30). To connect the two, a 1-D roller bearing support was designed and built, using a mounted bearing on the bottom and shaft supported by two roller bearings. The frame was built from aluminum plates and extruded aluminum framing, as shown in FIG. 30, supported by 3-D printed supports for the bearings themselves. The bearings were well-lubricated prior to the tests.

Here we present and discuss the data logged from the IMU sensor for the slewing test performed on the HIL testbed described in the previous section. Attitude slews on the one axis roller bearing test-bed were performed in both clockwise and counterclockwise directions. Performing slews in both directions demonstrates that prototype rotation could not be due only rotation table misalignment.

Due to constraints imposed by the design of the current system, such as the compliance of the deployable panels and discreet control of the linear actuators, all HIL tests were performed using open-loop bang-bang control trajectories. Such control trajectories produce significantly larger vibrational noise on the satellite during slews, but demonstrate the expected overall motion. Given the nature of the current open-loop control trajectories being used for the tests, the frequency of actuation for the linear actuators was constrained to be faster than the time period of the first natural frequency of the deployable panels, which then sets the peak slew rate of the prototype.

Figure 31:
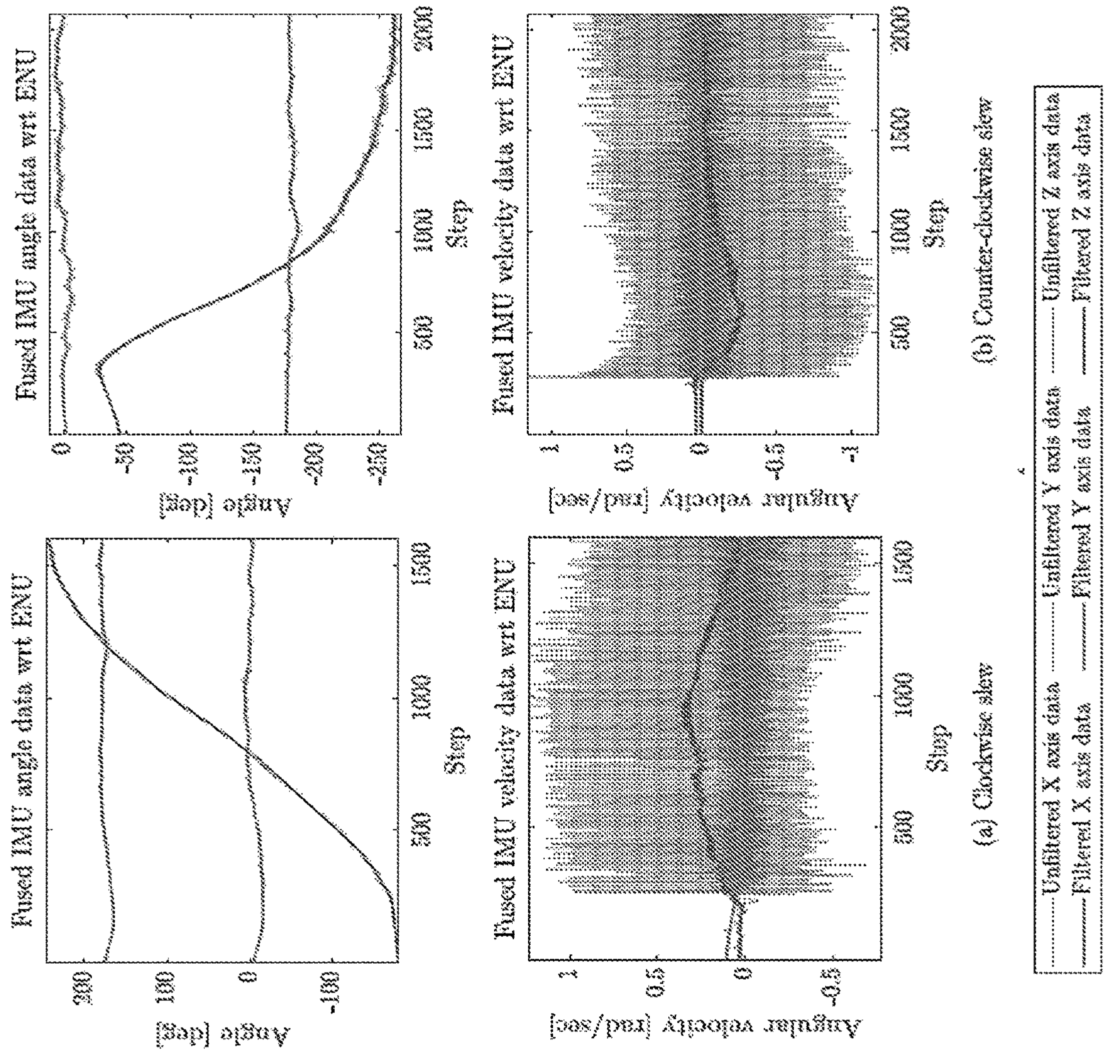
FIG. 31 illustrates experimental data including Hardware in the loop Euler angle and angular rate data during HIL slews about the local z-axis, where the gravity vector is along negative z-axis ("East-North-Up" ENU frame).

FIG. 31 (left side) shows the angular velocity data from the fused IMU estimates for the clockwise slew. The darker line is a low pass filtered measurement of the data-logged by the system, while the dashed line is the unfiltered measurement. The angle and velocity estimates were obtained using the gyroscope and accelerometer sensors; the magnetometer data was not reliable due to the large magnetic noise produced using the linear actuators. The attitude solution was obtained from the "imufilter" function provided by the robotics and sensing toolbox in MATLAB. The filters provide orientation and angular rate estimates in the "East-North-Up" local frame of reference. The orientation is reported as quaternions which are then converted to Euler angles using the "XYZ" notion.

Due to the low fidelity and open-loop nature of the control signal provided to the drive actuators, the vibrations experienced on the central satellite body is significantly higher than what would be expected in a distributed system. Despite larger vibrations, a clear attitude slew can be seen in the gyroscope data.

FIG. 31 (right side) shows the angular velocity data from the fused IMU estimates for the counter-clockwise slew. A similar trend-line is seen for both slews, which indicated that the slews are not due to misalignment and frictional force interactions.

While the described embodiments demonstrate a lumped actuation hardware representation of the MSAC concept, other embodiments may realize the same motions using distributed actuators embedded in deployable elastic panels which can produce similar motions. The magnitude of the peak slew rate is a function of the peak deflections (δ) produced and the frequency of actuation (f). The peak slew rate ($\omega_{max}$) can be approximated using Eq. (4).

$$\omega_{max}=\delta\cdot f \tag{4}$$

Figure 32:
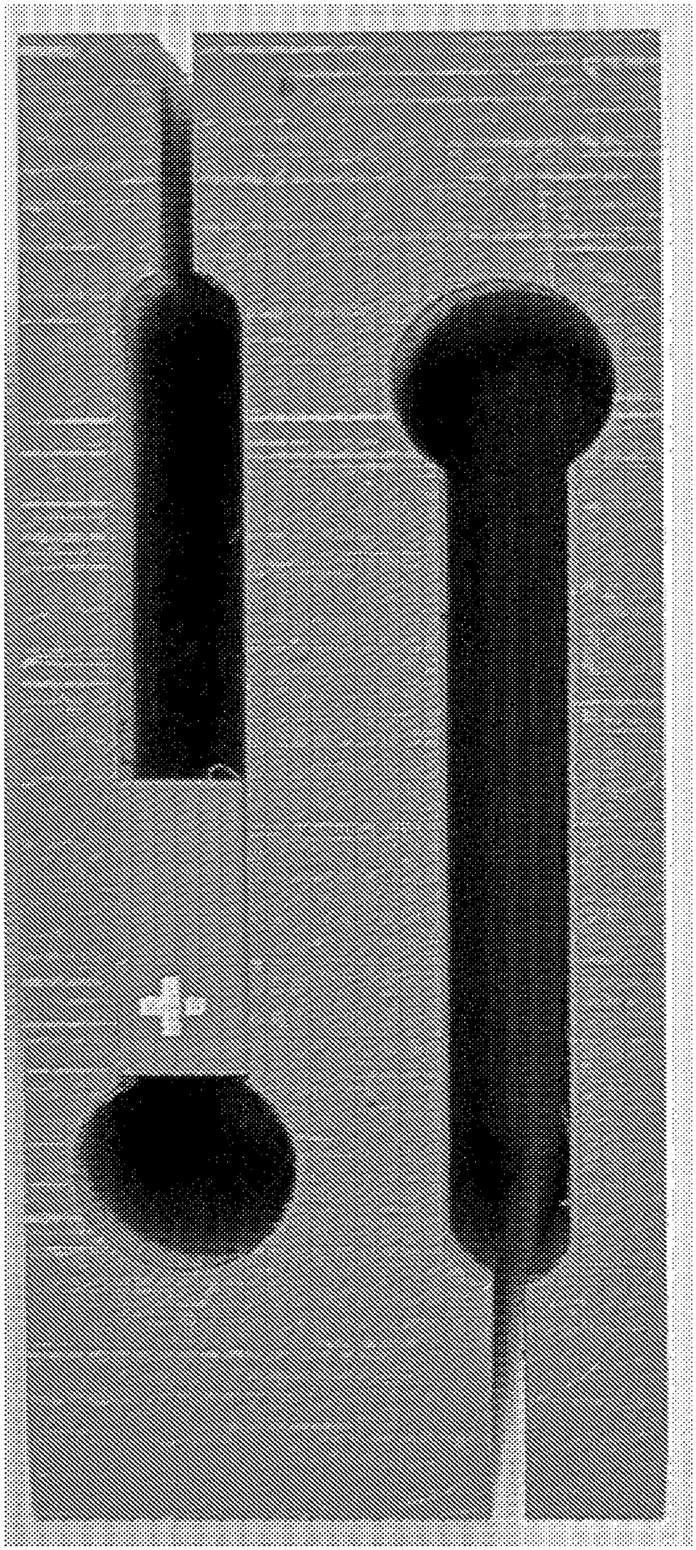
FIG. 32 illustrates a compliant actuator that uses piezoelectric elements (yellow) for actuation, according to an example embodiment. Total height of the actuator depicted is 10 mm.

Although in the distributed compliant realization of MSAC the peak deflections will be smaller than the lumped model realization, the frequency of operation f will be significantly higher, thereby having similar peak slew rates. FIG. 32 shows a physical realization of the actuators capable of compliant, low deflection high frequency MSAC prototype. This actuator depends on piezoelectric elements (yellow element in FIG. 32), which has significantly faster response times and lower magnetic noise.

The future development of this technology will include an expansion of its multifunctional capabilities. Currently, MSAC can make dual use of any deployable panels, thereby reducing the volume and mass budget of an ACS. Combining the MSAC with deployable panels developed for the ISARA28 mission allows for further mass and volume savings for the bus functionality while providing secondary benefits, such as better alignment of panels for high-frequency communication or Synthetic Aperture Radar (SAR) missions.

III. Example Methods

Figure 33:
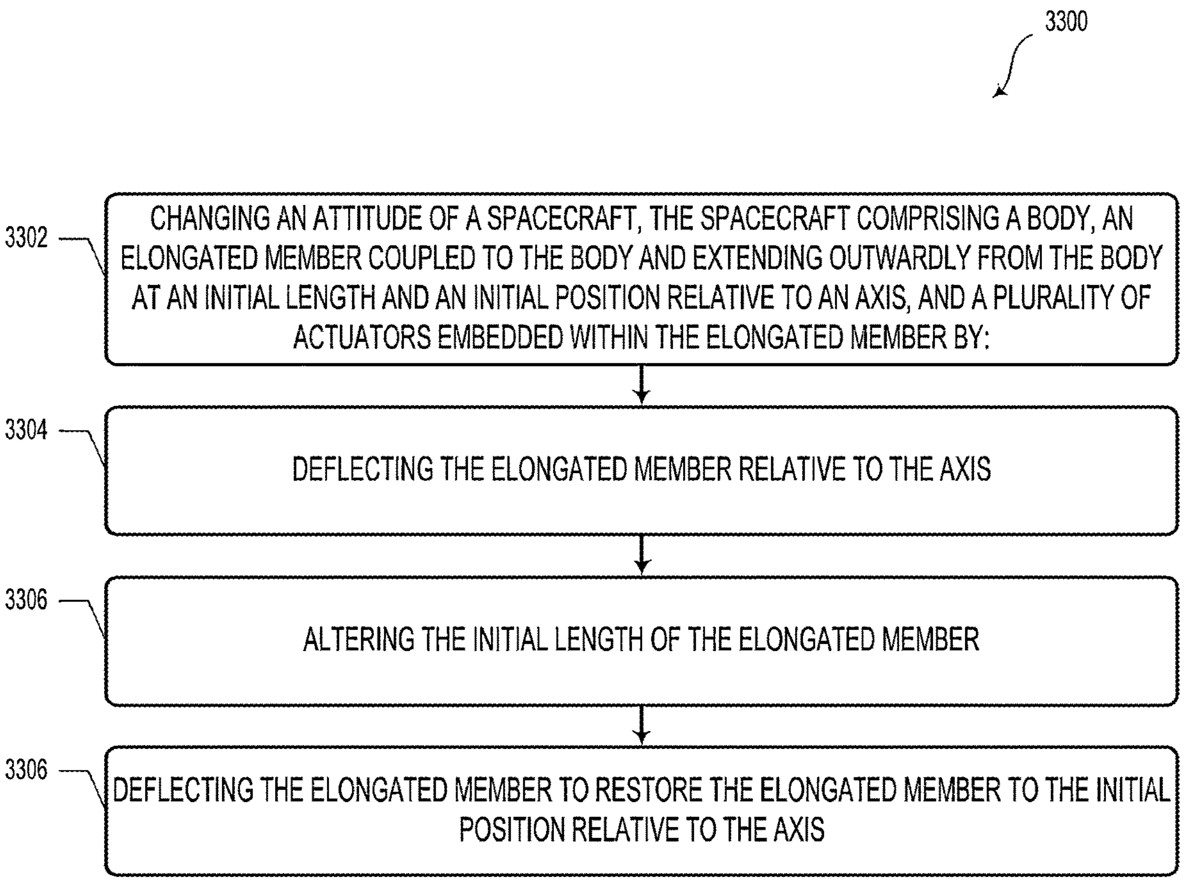
FIG. 33 illustrates a method, according to an example embodiment.

FIG. 33 illustrates a method 3300, according to an example embodiment. It will be understood that the method 3300 may include fewer or more steps or blocks than those expressly illustrated or otherwise disclosed herein. Furthermore, respective steps or blocks of method 3300 may be performed in any order and each step or block may be performed one or more times. In some embodiments, method 3300 could be carried out by elements of spacecraft 10. However, it will be understood that other scenarios are possible and contemplated within the context of the present disclosure.

Method 3300 includes a manner 3302 of changing an attitude of a spacecraft (e.g., spacecraft 10). The spacecraft includes a body (e.g., body 12), an elongated member (e.g., elongated member 14) coupled to the body and extending outwardly from the body at an initial length and an initial position relative to an axis. The spacecraft includes a plurality of actuators (e.g., actuators 46, 48) embedded within the elongated member.

Block 3304 includes deflecting the elongated member relative to the axis.

Block 3306 includes altering the initial length of the elongated member.

Block 3308 includes deflecting the elongated member to restore the elongated member to the initial position relative to the axis.

In an example embodiment, a rotation cycle of the elongated member could include: deflecting the elongated member relative to the axis, altering the initial length of the elongated member after deflecting the elongated member relative to the axis, deflecting the elongated member to restore the elongated member to the initial position relative to the axis after altering the initial length, altering the length of the elongated member to restore the initial length after deflecting the elongated member to restore the initial position of the elongated member relative to the axis.

In some embodiments, the method 3300 could include repeating the rotation cycle to increase the change in the attitude of the spacecraft.

In various embodiments, the method 3300 could include tuning a frequency of the rotation cycle to match a natural frequency of the elongated member.

In example embodiments, the method 3300 could include reversing the rotation cycle to decrease the change in the attitude of the spacecraft.

Additionally or alternatively, method 3300 include executing a rotation cycle for a second elongated member. In such scenarios, the second elongated member could be positioned on an opposing side of the body from the elongated member.

In some scenarios, deflecting the elongated member relative to the axis could include bending the elongated member such that an end of the elongated member furthest from the body is moved away from the axis. Additionally or alternatively, deflecting the elongated member relative to the axis could include twisting the elongated member about the axis.

Although specific components are described above, methods, systems, and articles of manufacture described herein may include additional, fewer, or different components. For example, the spacecraft 10 may include more than two elongated members 14 to enhance attitude control and to allow for more complex maneuvers. Additionally, the elongated member 14 may have a combination of the different actuators 46, 48 described above to produce complex deflections through multiple degrees of rotational freedom. In some embodiments, the elongated member 14 may presumed to be essentially rigid, but other embodiments may utilize the non-rigid nature of a different embodiment of the elongated member 14 to produce different angular changes 30 in the spacecraft 10.

Additionally, although specific methods are described above, methods described herein may include additional, fewer, or different steps. For example, the order of the steps in the rotation cycle may be reordered to produce an identical or different angular change 30 in the spacecraft 10. Furthermore, combinations of different rotation cycles may occur simultaneously to produce complex angular changes 30 through multiple degrees of rotational freedom.

IV. Additional Example Embodiments

While specific examples of systems and methods have been described above, it will be understood that other example embodiments and variations are possible and contemplated within the scope of the present disclosure.

For example, in some embodiments, systems and methods described herein need not include multiple discrete actuators, but could instead utilize a single strain actuator, which could be a spatially distributed strain actuator. As an example, the spatially distributed strain actuator could be a distributed piezoelectric actuator, a piezoceramic actuator, and/or another type of spatially-distributed actuator. Such a single, spatially-distributed strain actuator could be adjusted to produce the MSAC motions described herein.

Additionally, while piezoelectric actuators are specifically described herein, it will be understood that electromagnetic, hydraulic, pneumatic, thermal, magnetic, mechanical, or other types of actuators are possible and contemplated. As an example, a mechanical actuator could include an electric motor, a voice coil, and/or another type of vibration-producing and/or movement-producing actuator.

While embodiments herein describe elongated members (e.g., elongated member 14), which could connote a particular shape or geometry, it will be understood that non-elongated members, point masses, and/or irregularly-shaped members could also be utilized to produce MSAC motions as described herein. Accordingly, "elongated members" as described herein, could include elements that are not necessarily any particular shape or geometry. As an example, it will be recognized that systems and methods herein could be applied to adjust a variety of different elements or components associated with the spacecraft so as to create a net moment of inertia (MOI) change. Such a net MOI change could produce a torque about an axis, as described herein. Additionally or alternatively, one possible MSAC motion profile could include the following steps or blocks: (1) produce torques on the spacecraft by bending the elongated member (e.g., a solar panel); (2) change the MOI of the elongated member; (3) bend the elongated member to undo the original bending, which could produce a slightly different torque on the spacecraft, because of the different MOI; and (4) undo the change in MOI.

It will be understood that in the most general sense, MSAC operates by first altering the MOI to produce some rotation using an internal torque, and then changing the MOI again to produce a different torque. The difference between the changes in the moment of inertia can be controlled so as to move the spacecraft in a desired manner and/or to prevent undesirable movement of the spacecraft.

In yet further embodiments, some systems and methods could utilize actuation modes that do not provide any MOI change, but which may still move the spacecraft. For example, of this motion is when a deployable panel's tip (or a point mass) is rotated in a circular path.

Figure 34:
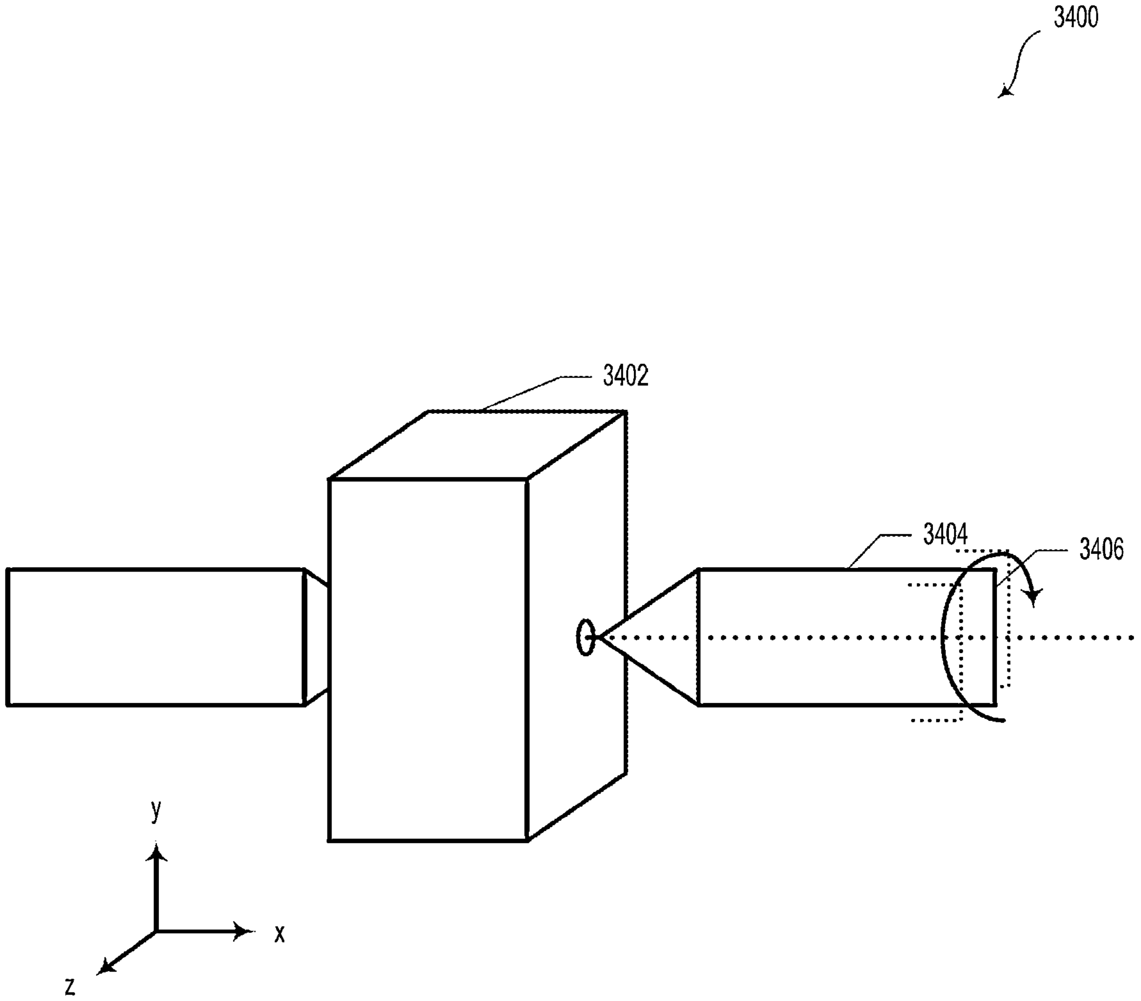
FIG. 34 illustrates an operating scenario, according to an example embodiment.

FIG. 34 illustrates an operating scenario 3400, according to an example embodiment. Operating scenario 3400 includes a spacecraft 3402 and an elongated member 3404, which could be a deployable element (e.g., a deployable solar panel). In such a scenario, causing a rotation of the elongated member 3304 in the y-z plane may produce a rotation of the spacecraft 302 about the x-axis. In other words, in such scenarios, a distal end 3306 of the elongated member could traces a circle in the y-z plane. In doing so, a torque could be applied to the spacecraft 3402 so as to rotate the spacecraft 3402. It will be understood that other motions are possible without adjusting the moment of inertia.

Furthermore, it will be understood that the systems and methods described herein could include one or more elongated members that are configured to provide MSAC movements as well as maintain one or more desired secondary functional aspects. For example, in the instance that the elongated members are solar panels, such solar panels could be adjustable so as to both 1) provide MSAC movements to move the overall spacecraft; and 2) maintain a desired orientation of the solar panels with respect to a light source. Additionally or alternatively, the elongated members could include tensegrity based structures, as described elsewhere herein.

In addition to the advantages that have been described, it is also possible that there are still other advantages that are not currently recognized but which may become apparent at a later time. While various embodiments have been described, it will be apparent to those of ordinary skill in the art that many more embodiments and implementations are possible. Accordingly, the embodiments described herein are examples, not the only possible embodiments and implementations.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A structure for changing an attitude of a spacecraft, comprising:

an elongated member coupled to the spacecraft, the elongated member having a length and an angular position relative to an axis passing through the spacecraft; and at least one actuator coupled to the elongated member, wherein the at least one actuator is configured to deflect the angular position of the elongated member relative to the axis, and to alter the length of the elongated member, wherein the deflection of the angular position of the elongated member relative to the axis and the alteration of the length of the elongated member together move the spacecraft though a rotation cycle, and wherein the rotation cycle results in a secular angular change of the spacecraft.

2. The structure of claim 1, wherein the at least one actuator comprises an array of piezoelectric elements embedded within the elongated member and extending along the length of the elongated member.

3. The structure of claim 1, wherein the at least one actuator comprises a piezoelectrically operated lever mechanism embedded within the elongated member.

4. The structure of claim 3, wherein the piezoelectrically operated lever mechanism comprises a plurality of stacked struts and a plurality of piezoelectric elements, wherein each of the struts extend from a first side to a second side, each of the struts are coupled adjacent struts at a plurality of joints formed alternatingly on the first side and the second side, and each of the plurality of piezoelectric elements are positioned proximate to one of the plurality of joints.

5. The structure of claim 4, wherein each of the stacked struts is made from a strong metal capable of withstanding high stress.

6. The structure of claim 5, wherein the strong metal capable of withstanding high stress comprises ANSI-4030 steel.

7. The structure of claim 1, wherein the at least one actuator comprises a first actuator arranged on a first side of the elongated member, and a second actuator arranged on an opposing second side of the elongated member.

8. The structure of claim 1, wherein the elongated member comprises a geometric prism having a plurality of corners and a base coupled to the spacecraft, wherein the at least one actuator is positioned proximate to one of the plurality of corners.

9. The structure of claim 1, wherein the at least one actuator comprises a spatially distributed strain actuator.

10. The structure of claim 1, wherein the at least one actuator comprises at least one of: a piezoelectric actuator, an electromagnetic actuator, a hydraulic actuator, a pneumatic actuator, a thermal actuator, a magnetic actuator, or a mechanical actuator.

11. The structure of claim 1, wherein the rotation cycle is performed at a rate that is at or around a natural frequency of the elongated member.

12. The structure of claim 1, wherein the elongated member comprises an empty rectangular frame shape.

13. The structure of claim 1, wherein the elongated member comprises an ellipsoidal shape.

14. The structure of claim 1, wherein the elongated member comprises a complex polyhedron shape.

15. The structure of claim 1, wherein the at least one actuator comprises a mechanical actuator.

16. The structure of claim 15, wherein the mechanical actuator comprises an electric motor.

17. The structure of claim 15, wherein the mechanical actuator comprises a voice coil.

18. The structure of claim 1, wherein the at least one actuator comprises a hydraulic actuator or a pneumatic actuator.

19. The structure of claim 1, wherein the rotation cycle comprises:

an initial deflection of the elongated member from an initial angular position to an altered angular position relative to the axis, wherein the spacecraft undergoes an initial angular change;

a compression of the elongated member from an initial length to an altered length, wherein the compression of the elongated member decreases a mass moment of inertia of the elongated member; and a second deflection of the elongated member from the altered angular position to the initial angular position, wherein the spacecraft undergoes a subsequent angular change toward the initial position of the spacecraft, wherein the subsequent angular change of the spacecraft back toward the initial position is less than the initial angular change of the spacecraft during the initial deflection of the elongated member, and wherein the secular angular change of the spacecraft comprises a difference between the initial angular change and the subsequent angular change.

20. The structure of claim 19, wherein the rotation cycle comprises:

after completing the second deflection of the elongated member, adjusting the elongated member from the altered length back to the initial length.

* * * * *